US006481202B1

(12) United States Patent
Zuehlke et al.

(10) Patent No.: US 6,481,202 B1
(45) Date of Patent: Nov. 19, 2002

(54) HYDRAULIC SYSTEM FOR BOOM HOIST CYLINDER CRANE

(75) Inventors: Arthur G. Zuehlke, Manitowoc, WI (US); Charles R. Wernecke, Manitowoc, WI (US); David J. Pech, Manitowoc, WI (US)

(73) Assignee: Manitowoc Crane Companies, Inc., Reno, NV (US)

( * ) Notice: Subject to any disclaimer, the term of this patent is extended or adjusted under 35 U.S.C. 154(b) by 0 days.

(21) Appl. No.: 09/175,065

(22) Filed: Oct. 19, 1998

Related U.S. Application Data

(63) Continuation of application No. 09/061,804, filed on Apr. 16, 1998, now abandoned.

(60) Provisional application No. 60/041,555, filed on Apr. 16, 1997.

(51) Int. Cl.[7] .......................... F16D 31/02; B06C 23/42

(52) U.S. Cl. ............................ 60/464; 60/475; 91/461; 212/299

(58) Field of Search .......................... 60/464, 473, 475, 60/423, 420, 486; 212/295, 297, 299, 300

(56) References Cited

U.S. PATENT DOCUMENTS 2,425,496 A 8/1947 Tyler
2,621,479 A 12/1952 Wright
2,635,427 A * 4/1953 Baugh et al. ................. 60/475

(List continued on next page.)

OTHER PUBLICATIONS

Specification Sheet, Sun Hydraulics, Valve DKJS XHN, 2 pages, (date illegible).

Specification Sheet, Sun Hydraulics, Valve SCIA–LAN, 1 page, (undated).

Specification Sheet, Sun Hydraulics, Hot Shuttle Valve w/relief part No. 9611 12C A06, 1 page (Dec. 4, 1996).

Specification Sheet, Sun Hydraulics, Valve DSGH–XHN, 1 page (undated).

Specification Sheet, Sun Hydraulics, Valve CVGV–XCN, 1 page (undated).

(List continued on next page.)

*Primary Examiner*—John E. Ryznic
(74) *Attorney, Agent, or Firm*—Steven P. Shurtz; Brinks Hofer Gilson & Lione

(57) ABSTRACT

A crane having an upper works rotatably mounted on a lower works and a boom pivotally mounted on the upper works includes a hydraulic boom hoist cylinder and a hydraulic circuit for controlling the hydraulic boom hoist cylinder. The hydraulic cylinder is pivotally connected to a mast on the upper works and pendently connected to the boom. The boom hoist cylinder preferably comprises two double-acting hydraulic cylinders. The hydraulic circuit includes a closed loop pump and a hydraulic controller connecting the closed loop pump and the double-acting cylinders such that fluid from the pump can be directed either to extend or retract the cylinders, with the hydraulic fluid exiting the cylinders being directed to return to the pump.

19 Claims, 16 Drawing Sheets

U.S. PATENT DOCUMENTS

| | | | | | |
|---|---|---|---|---|---|
| 2,961,829 | A | | 11/1960 | Weisenbach | |
| 3,222,865 | A | | 12/1965 | Miller | |
| 3,230,699 | A | | 1/1966 | Hann et al. | |
| 3,359,727 | A | | 12/1967 | Hann et al. | |
| 3,425,574 | A | | 2/1969 | Willgrubs et al. | |
| 3,585,797 | A | | 6/1971 | Moon et al. | |
| 3,636,708 | A | * | 1/1972 | Karman et al. | 91/420 X |
| 3,686,862 | A | | 8/1972 | Grider et al. | |
| 3,737,049 | A | * | 6/1973 | Farmer | 212/285 |
| 3,738,501 | A | | 6/1973 | Gill | 60/484 X |
| 3,851,766 | A | | 12/1974 | Gill et al. | 60/426 X |
| 3,870,158 | A | * | 3/1975 | Burley | 212/299 X |
| 3,971,215 | A | * | 7/1976 | Baron et al. | 60/464 X |
| 3,999,387 | A | | 12/1976 | Knopf | |
| 4,039,085 | A | * | 8/1977 | Livengood | 212/299 |
| 4,363,413 | A | | 12/1982 | Gyomrey | |
| 4,427,121 | A | * | 1/1984 | Clements | 212/300 X |
| 4,510,750 | A | | 4/1985 | Izumi et al. | |
| 4,520,626 | A | * | 6/1985 | Nakajima et al. | 61/468 |
| 4,523,686 | A | * | 6/1985 | Moore et al. | 60/444 X |
| 4,548,036 | A | | 10/1985 | Matsuda et al. | |
| 4,561,249 | A | | 12/1985 | Watanabe et al. | |
| 4,632,261 | A | | 12/1986 | Cuhel | |
| 4,662,527 | A | | 5/1987 | Cuhel | |
| 4,702,076 | A | * | 10/1987 | Rosman | 60/372 |
| 4,845,948 | A | | 7/1989 | Tha et al. | |
| 4,946,051 | A | | 8/1990 | Cliff | |
| 4,961,316 | A | * | 10/1990 | Corke et al. | 60/475 X |
| 4,990,111 | A | * | 2/1991 | Saitoh et al. | 60/464 X |
| 5,189,605 | A | | 2/1993 | Zuehlke et al. | |
| 5,199,586 | A | | 4/1993 | Pech et al. | |
| 5,297,019 | A | | 3/1994 | Zuehlke | |
| 5,329,767 | A | * | 7/1994 | Hewett | 60/475 |
| 5,427,256 | A | | 6/1995 | Kleppe | |
| 5,484,069 | A | | 1/1996 | Lanning | |
| 5,579,931 | A | | 12/1996 | Zuehlke et al. | |
| 5,613,361 | A | * | 3/1997 | Dantlgraber et al. | 60/475 X |
| 5,638,679 | A | * | 6/1997 | Richards | 60/420 X |
| 5,819,536 | A | * | 10/1998 | Mentink | 60/464 |
| 5,823,279 | A | | 10/1998 | Petzold | |
| 5,960,970 | A | | 10/1999 | Walker | 212/294 |
| 6,010,018 | A | | 1/2000 | Pech | |
| 6,062,405 | A | * | 5/2000 | Pech et al. | 212/298 |

OTHER PUBLICATIONS

Specification Sheet, Mannesmann Rexroth, Directional Control Valve 3 Model WEG . . . /E, 2 pages (undated).

Technical Drawing, Commerical Intertech, Part No. (illegible), 1 page (undated).

Brochure entitled: "Axial Piston Pumps Technical Information Series 90," Sauer Sundstrand, pp. 5A, 5B, 6, 7, 22 and 23 (undated).

* cited by examiner 10
20
22
30
34
36
46
54
56
58
60
62
64
66
68
102
110
112
116
118
120
122
124
126
128

HYDRAULIC SYSTEM FOR BOOM HOIST CYLINDER CRANE

REFERENCE TO EARLIER FILED APPLICATIONS

The present application is a continuation of application Ser. No. 09/061,804 filed Apr. 16, 1998 now abondoned, which in turn claims the benefit under 35 U.S.C. §119(e) of the filing date of Provisional U.S. Patent Application Ser. No. 60/041,555 filed Apr. 16, 1997, which is hereby incorporated by reference. Other patent applications and U.S. patents referred to herein are also hereby incorporated by reference.

BACKGROUND OF THE INVENTION

The present invention relates to construction equipment, such as cranes. In particular, the present invention relates to a crane having a hydraulic circuit to control a hydraulic boom hoist cylinder. Aspects of a crane incorporating the preferred embodiment of the invention are disclosed in the following pending U.S. patent applications: patent application Ser. No. 08/834,673, filed Apr. 1, 1997; patent application Ser. No. 08/834,724 filed Apr. 1, 1997; patent application Ser. No. 60/041,555, filed Apr. 16, 1997; patent application Ser. No. 08/845,843, filed Apr. 25, 1997; patent application Ser. No. 08/826,627, filed Apr. 3, 1997; patent application Ser. No. 08/842,974, filed Apr. 25, 1997; and patent application Ser. No. 08/950,870, filed Oct. 15, 1997; the disclosures of which are hereby incorporated by reference.

Construction equipment, such as cranes or excavators, often must be moved from one job site to another. Moving a crane or, an excavator can be a formidable task when the machine is large and heavy. For example, highway limits on vehicle-axle loads must be observed and overhead obstacles can dictate long, inconvenient routings to the job site.

One solution to improving the mobility of large construction machines, such as cranes, is to disassemble them into smaller, more easily handled components. The separate components can then be transported to the new job site where they are reassembled.

The typical practice has been to use an assist crane to disassemble the crane into the separate components. The assist crane is then used to load the components onto their respective transport trailers. Once at the new job site, another assist crane is used to unload the components and reassemble the crane. As the components for a large crane can weigh as much as 80,000 lbs., the capacity of the assist crane required represents a very significant transport expense.

As a result, designers have attempted to develop self-handling systems for assembling and disassembling cranes. The majority of the self-handling systems developed thus far have been directed to smaller cranes which need to be disassembled into only a few components.

The development of self-handling systems for larger cranes, however, has met with limited success. One reason for this is that larger cranes need to be disassembled into numerous components, thus requiring time-consuming disassembly and reassembly procedures. For example, a large capacity crane typically uses a complicated and cumbersome rigging system to control the angle of the boom. Boom rigging system components such as the equalizer, the backhitch, and wire rope rigging are heavy and difficult to disassemble for transport. Another reason for the limited success of prior art self-assembling cranes is that they typically rely on additional crane components that are used only for assembling and disassembling the crane. For example, some self-assembling cranes require additional wire rope guides and sheaves on the boom butt so that a load hoist line can be used with the boom butt to lift various crane components during the assembly process. An example of one prior art method for disassembling a typical large capacity crane is disclosed in U.S. Pat. No. 5,484,069.

It is therefore desirable to provide a crane and method of self-assembly which reduces the number of parts which must be derigged and removed to disassemble the crane for transport. In addition, it is desirable to eliminate components which are only used during the crane assembly process. A crane which uses one or more hydraulic cylinders as boom hoist cylinders to control the boom angle would thus be advantageous.

Cranes and other equipment often use hydraulic actuators, primarily motors and cylinders, to power the components of the equipment. The hydraulic power for such actuators is normally supplied by one or more diesel engines powering one or more hydraulic pumps. The hydraulic systems for cranes and other equipment have ordinarily been open loop systems, where hydraulic fluid is drawn from a low pressure reservoir, such as an atmospheric pressure tank, into the intake of the pump. Fluid expended by the actuators is returned to the reservoir. Closed loop hydraulic systems are more energy efficient, but generally are more complicated. It would be advantageous if a closed loop hydraulic system would be used to operate the various components of the equipment, including the boom hoist cylinders.

Prior art hydraulic circuits are known for operating double-acting hydraulic cylinders with a closed loop pump. For example, U.S. Pat. No. 3,425,574 to Willgrubs et al. discloses a power shovel with a double-acting cylinder. Closed loop piston pumps are used to power the cylinder in both directions by changing the direction of the motor powering the pumps. The cylinder of Willgrubs has a ratio of the change of volume of the rod end of the cylinder to the change in volume of the piston end of the cylinder of about 1:2.78. The additional fluid needed to compensate for this difference in volume is taken care of by four vane pumps. However, because of the arrangement of the system, the vane pumps add fluid to the closed loop portion of the circuit by discharging into the high pressure side of the circuit.

SUMMARY OF THE INVENTION

In preferred aspects, the invention provides a crane having one or more hydraulic boom hoist cylinders and a hydraulic circuit to control the hydraulic boom hoist cylinders.

In one aspect, the invention is a crane having an upper works rotatably mounted on a lower works and a boom pivotally mounted on the upper works comprising a mast pivotally connected to the upper works; a double-acting hydraulic cylinder having a bore, a piston mounted in the bore and forming a piston end of the cylinder, and a rod connected to the piston opposite the piston end and extending out of an exit end of the bore but being sealed at the exit end of the bore, thus forming a rod end of the cylinder, the cylinder having a first passageway in communication with the piston end and a second passageway in communication with the rod end, one of the piston end of the cylinder and the rod being pivotally connected to the upper works and the other of the piston end of the cylinder and the rod being pivotally connected to the mast; a closed loop hydraulic pump having, during operation, a low pressure port in fluid communication with a low pressure side of the hydraulic circuit and a high pressure port in fluid communication with a high pressure side of the hydraulic circuit; and a directional flow controller and hydraulic lines connecting the closed loop pump and the double-acting cylinder such that fluid from the pump can be directed to either the first or second passageways and fluid from the other of the first or second passageways is then directed to return to the pump.

In a second aspect, the invention is hydraulic circuit comprising a first double-acting hydraulic cylinder having a bore, a piston mounted in the bore and forming a piston end of the cylinder, and a rod connected to the piston opposite the piston end and extending out of an exit end of the bore but being sealed at the exit end of the bore, thus forming a rod end of the cylinder, the cylinder having a first passageway in communication with the piston end and a second passageway in communication with the rod end; a closed loop hydraulic pump having, during operation, a low pressure port in fluid communication with a low pressure side of the hydraulic circuit and a high pressure port in fluid communication with a high pressure side of the hydraulic circuit, a directional flow controller and hydraulic lines connecting the closed loop pump and the double-acting cylinder such that fluid from the pump can be directed to either the first or second passageways and fluid from the other of the first or second passageways is directed to return to the pump, a second hydraulic pump in fluid communication with the closed loop hydraulic pump so as to supply make-up hydraulic fluid to the low pressure side of the hydraulic circuit when the rod is being extended; and a relief valve in fluid communication with the first passageway when the rod is being retracted to allow excess hydraulic fluid to flow out of the circuit.

In the present invention, the use of a hydraulic cylinder pivotally connected at one end to the upper works of a lift crane and at the other end to the mast, and used to control the boom angle, is a significant advantage over other commercial cranes in use today. Further, to be able to use a double-acting cylinder for the boom hoist function, and to be able to use a closed loop pump to power the cylinder, is a further unique feature of the crane. The unique hydraulic circuit of the present invention allows a double-acting hydraulic cylinder to be powered by a closed loop pump, with make-up fluid needed when the cylinder is being extended to be supplied by a second pump feeding the low pressure side of the closed loop pump.

These and other advantages, as well as the invention itself, will become apparent in the details of construction and operation as more fully described and claimed below.

DETAILED DESCRIPTION OF THE DRAWINGS AND PREFERRED EMBODIMENTS OF THE INVENTIONS

Figure 1:
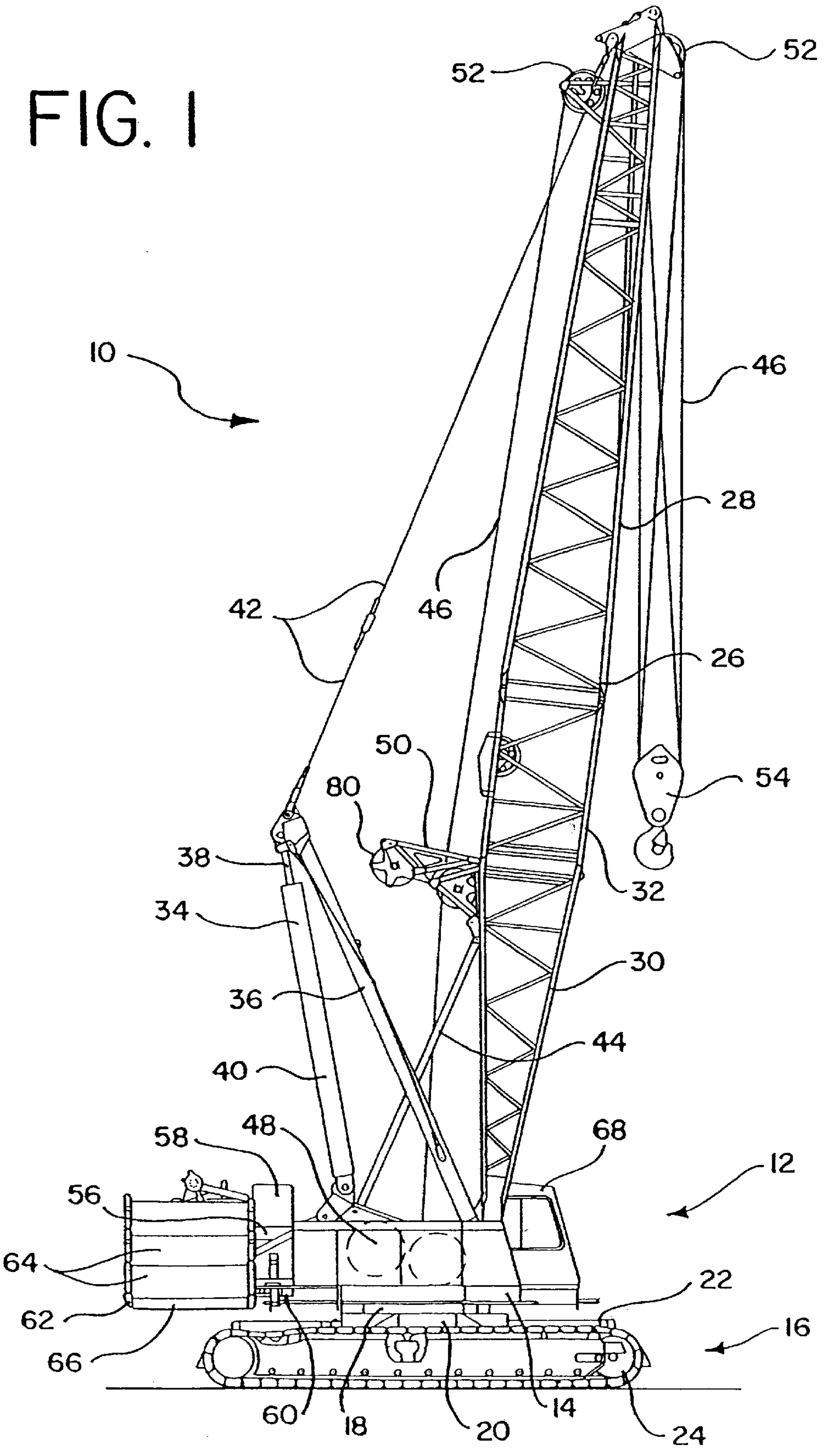
FIG. 1 is a right side elevational view of a complete boom hoist cylinder crane incorporating a hydraulic boom hoist cylinder and a hydraulic circuit to control the hydraulic boom hoist cylinder made in accordance with the teachings of this invention.
Figure 2:
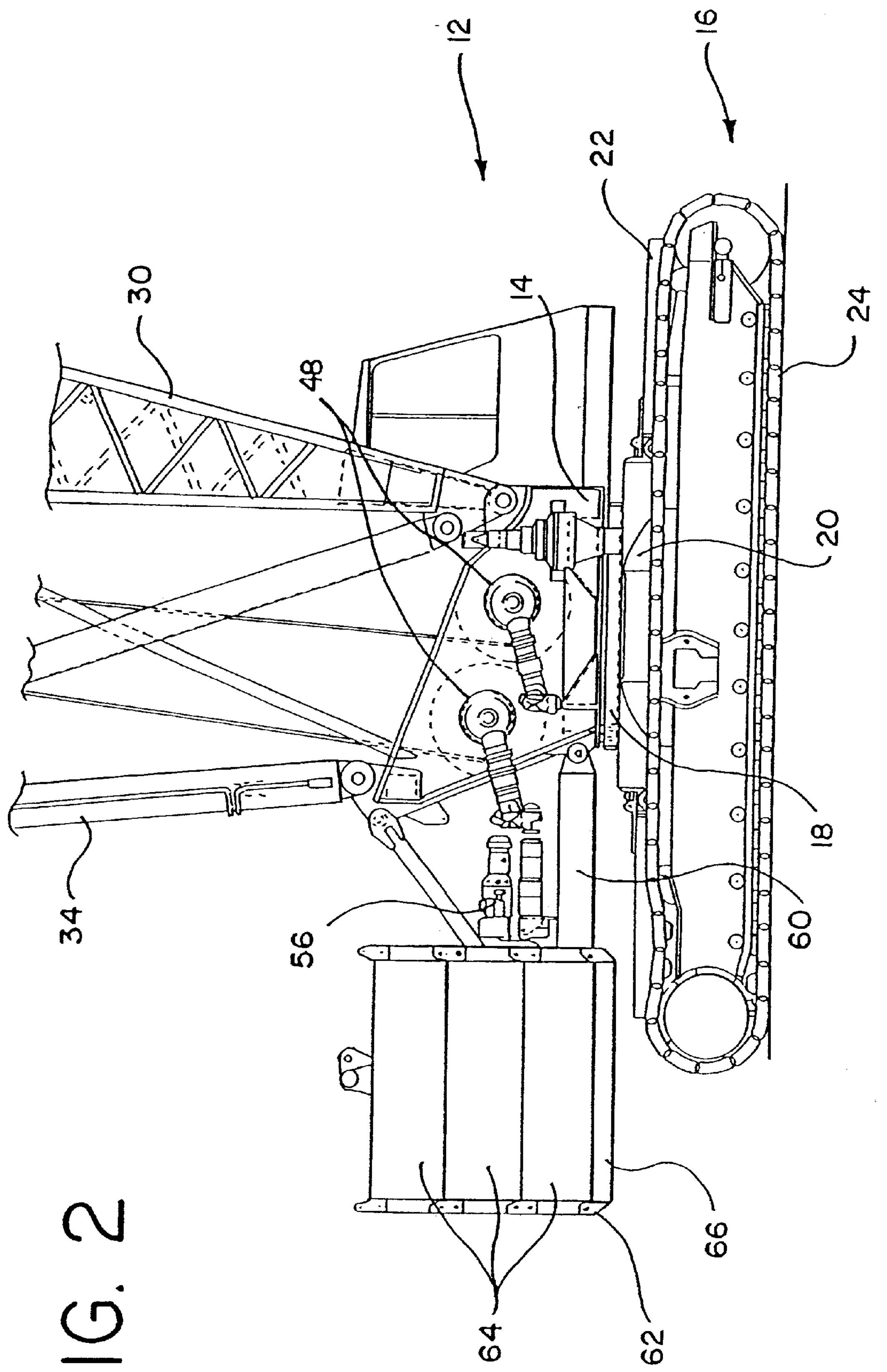
FIG. 2 is a partial right side elevational view of the boom hoist cylinder crane showing some of the internal components of the crane upper works.

While the present invention will find application in all types of cranes or construction machines, the preferred embodiment of the invention is described in conjunction with the boom hoist cylinder crawler crane 10 of FIGS. 1 and 2. The boom hoist cylinder crawler crane 10 includes an upper works 12 having a rotating bed 14 which is rotatably connected to a lower works 16 by a swing bearing 18. The lower works 16 includes a car body 20, car body counter weights 22, and two independently powered crawlers 24.

The upper works includes a boom 26 pivotally connected to the upper works 12. The boom 26 comprises a boom top 28 and a tapered boom butt 30. The boom 26 may also include one or more. boom inserts 32 connected between the boom top 28 and the boom butt 30 to increase the overall length of the boom 26. The angle of the boom 26 is controlled by a pair of hydraulic boom hoist cylinders 34 pivotally connected to the upper works 12. A mast 36 is pivotally connected between the piston rods 38 of the hydraulic boom hoist cylinders 34 and the upper works 12. The boom hoist cylinders 34 are connected to the upper works 12 at a point preferably near the lower end of the boom hoist cylinders 34, but may be connected to the upper works 12 at any point along the bore 40 of the boom hoist cylinders 34. The boom 26 is connected to the piston rods 38 of the hydraulic boom hoist cylinders 34 and the mast 36 by one or more boom pendants 42. The boom pendants 42 may be connected to either the mast 36 or the piston rods 38 of the hydraulic boom hoist cylinders 34, but preferably are connected at a point near the connection between the mast 36 and the piston rods 38 of the hydraulic boom hoist cylinders 34. A boom backstop 44 is provided to prevent the boom 26 from exceeding a safe operating angle.

The position of the boom 26 is controlled by the hydraulic boom hoist cylinders 34. The mast 36 supports the connection between the hydraulic boom hoist cylinders 34 and the boom pendants 42 at a location that is distanced from the axis of the boom 26 to optimize the forces in the boom pendants 42 and the hydraulic boom hoist cylinders 34. This arrangement also permits the hydraulic boom hoist cylinders 34 to impart a force having a component that is perpendicular to the axis of the boom 26. This force is transferred to the end of the boom 26 by the boom pendants 42.

Extending the hydraulic boom hoist cylinders 34 decreases the angle between the front of the boom 26 and the ground. Conversely, retracting the hydraulic boom hoist cylinders 34 increases the angle between the front of the boom 26 and the ground. Under normal operating conditions, the hydraulic boom hoist cylinders 34 and the boom pendants 42 are in tension from the weight of the boom 26 and any load being lifted by the crane 10. Conversely, the mast 36 is in compression under normal operating conditions.

Figure 3:
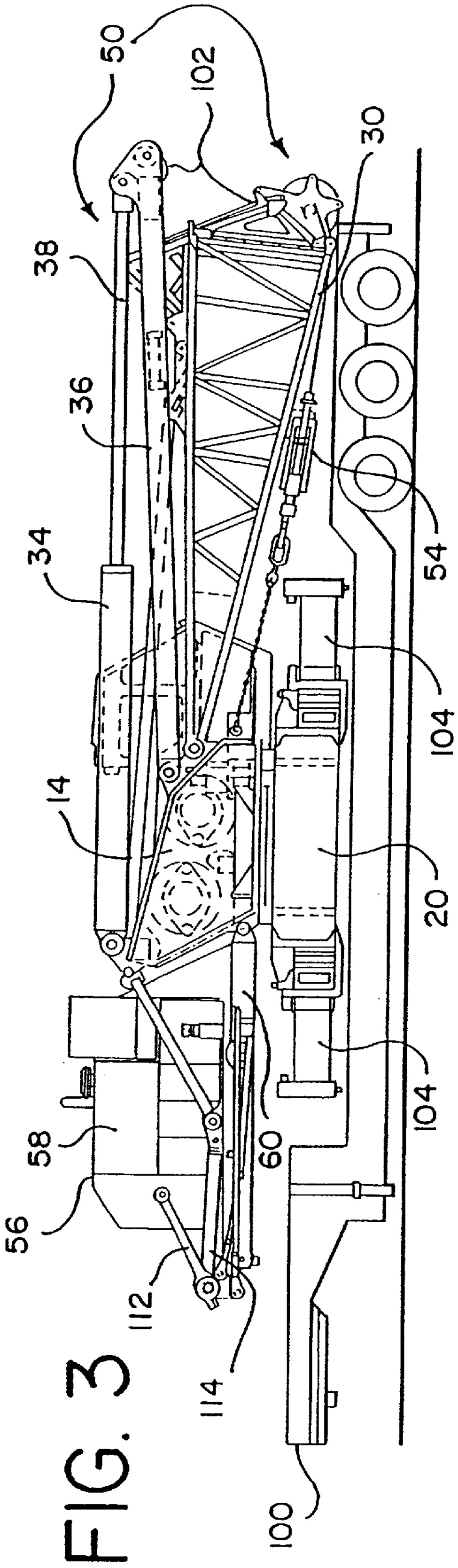
FIGS. 3–7 are right side elevational views of the crane in sequential stages of lower works assembly.
Figure 4:
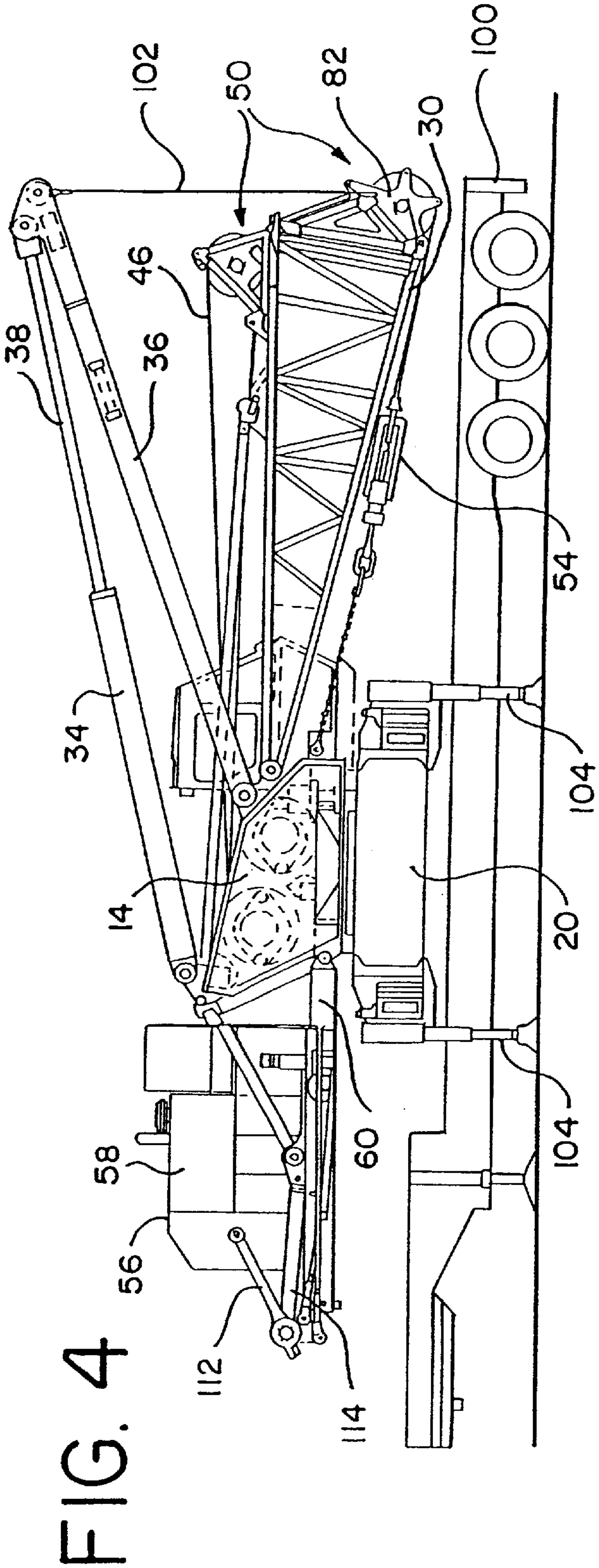

As best seen in FIG. 2, the mast 36 and the hydraulic boom hoist cylinders 34 are pivotally connected to the top of the rotating bed 14 of the upper works 12. The connection of the boom hoist cylinders 34 to the rotating bed 14 is at a position that is behind and higher in elevation than the connection of the mast 36 to the rotating bed 14. As best seen in FIGS. 3–4, this configuration allows the hydraulic boom hoist cylinders 34 and the mast 36 to be lowered to an approximately horizontal position on top of the upper works 12 when the crane 10 has been disassembled for transport. It is important to minimize the overall height of the disassembled crane 10 so that highway height restrictions will not be violated during transport to and from the job site. This configuration also allows the hydraulic boom hoist cylinders 34 to control the boom 26 even when the boom has been lowered to an angle which is below horizontal.

In the crane 10 of the preferred embodiment shown, two hydraulic boom hoist cylinders 34 are used in tandem. However, it should be understood that any number of hydraulic boom hoist cylinders 34, including a single hydraulic cylinder, can be used in the above described arrangement. The hydraulic boom hoist cylinders 34 must have sufficient capacity to function under the loads generated by the operation of the crane 10 when lifting objects. The pistons 38 of the hydraulic boom hoist cylinders 34 should also have a stroke of sufficient length so as to be lowered on top of the upper works 12 for disassembly and transport without requiring disconnection from the mast 36. In the preferred embodiment shown, which is for a crane having a rating of 120–175 tons, each hydraulic boom hoist cylinder 34 has a stroke of 160 inches.

In the preferred embodiment shown, the mast 36 is comprised of a frame. Alternatively, the mast 36 can be comprised of a pair of individual struts. The mast 36 should not interfere with the operation of the load hoist lines 46 or the boom backstop 44.

The upper works 12 further includes one or more load hoist lines 46 for lifting loads. Each load hoist line 46 is reeved around a load hoist line drum 48 supported on the rotating bed 14 of the upper works 12. The load hoist line drums 48 are rotated to either pay out or retrieve the load hoist lines 46. The load hoist lines 46 pass through a wire rope guide 50 attached to the upper interior side of the boom butt 30 and are reeved around a plurality of boom top sheaves 52 located at the upper end of the boom top 28. The wire rope guide 50 prevents the load hoist lines 46 from interfering with the lattice structure of the boom 26. A hook block 54 is typically attached to each load hoist line 46.

As best seen in FIG. 2, the upper works 12 further includes a power plant 56, such as a diesel engine, enclosed by a power plant housing 58 and supported on a power plant base 60. The power plant base 60 is connected to the rear of the rotating bed 14. Connected to the power plant base 60 is a upper counter weight assembly 62 comprising a plurality of counter weights 64 supported on a counter weight tray 66. The power plant 56 supplies power for the various mechanical and hydraulic operations of the crane 10, including movement of the crawlers 24, rotation of the rotating bed 14, rotation of the load hoist line drums 48, and operation of the hydraulic boom hoist cylinders 34. The mechanical and hydraulic connections between the power plant 56 and the above-listed components have been deleted for clarity. Operation of the various functions of the crane are controlled from the operator's cab 68.

Figure 5:
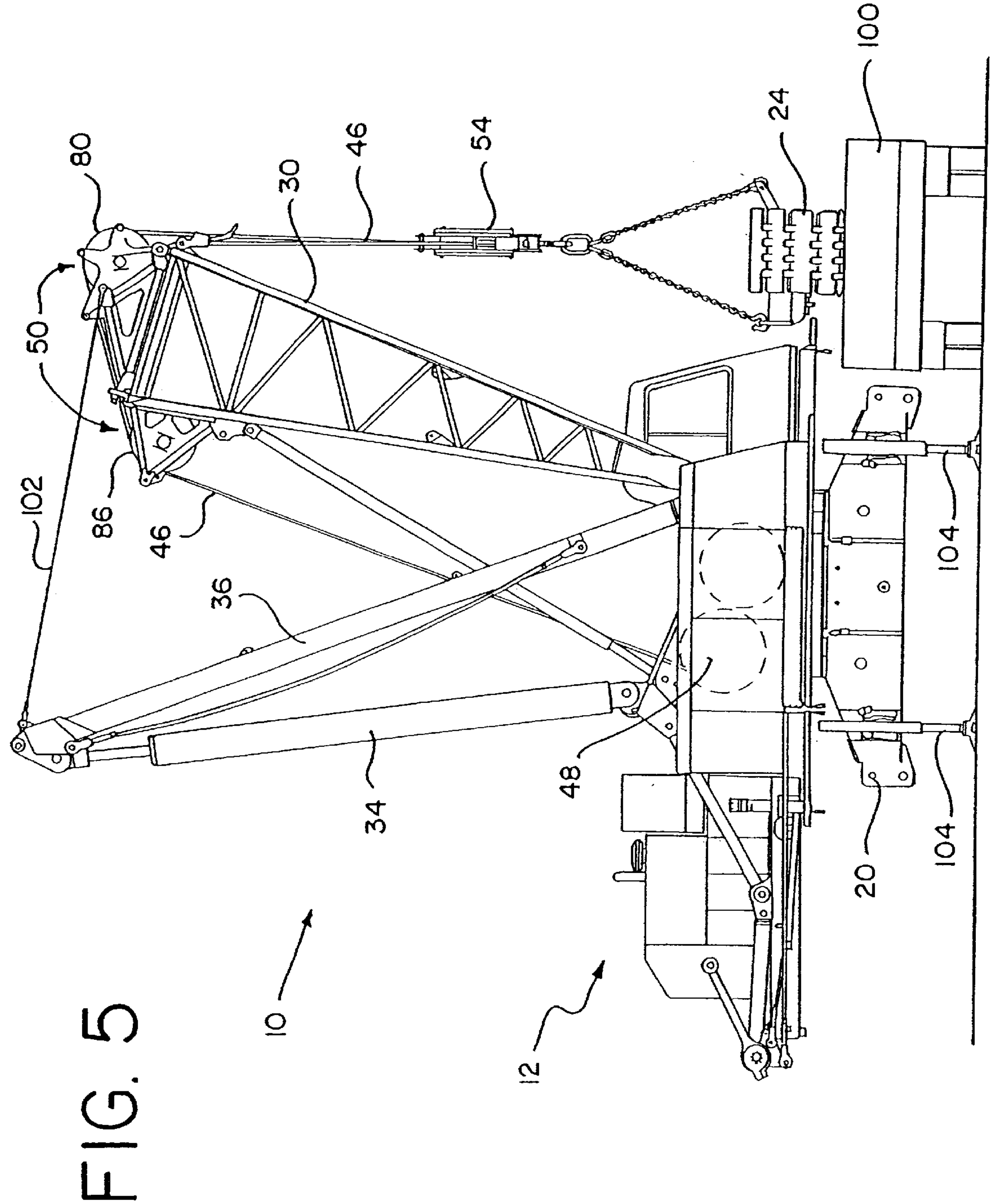
Figure 6:
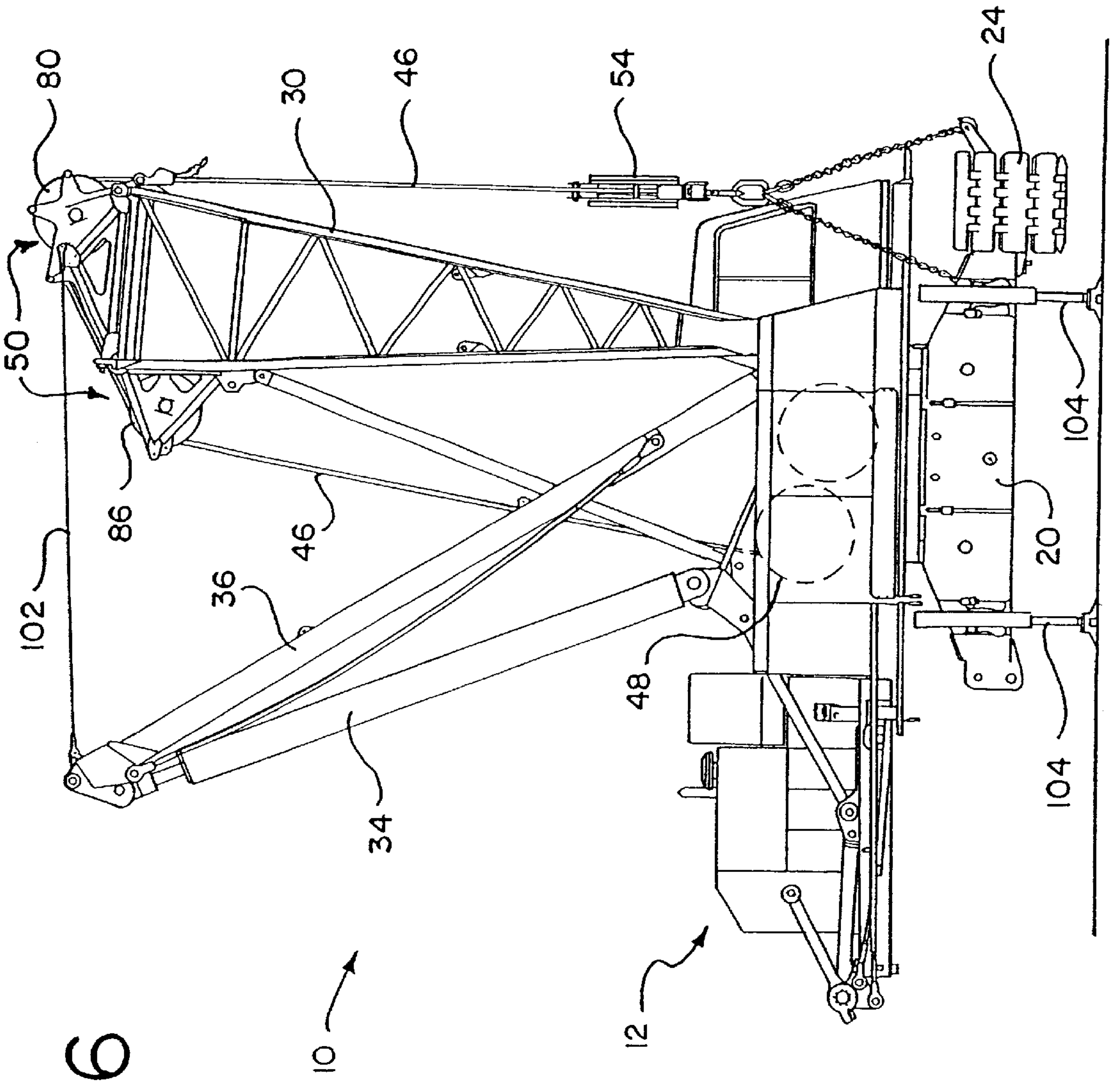
Figure 7:
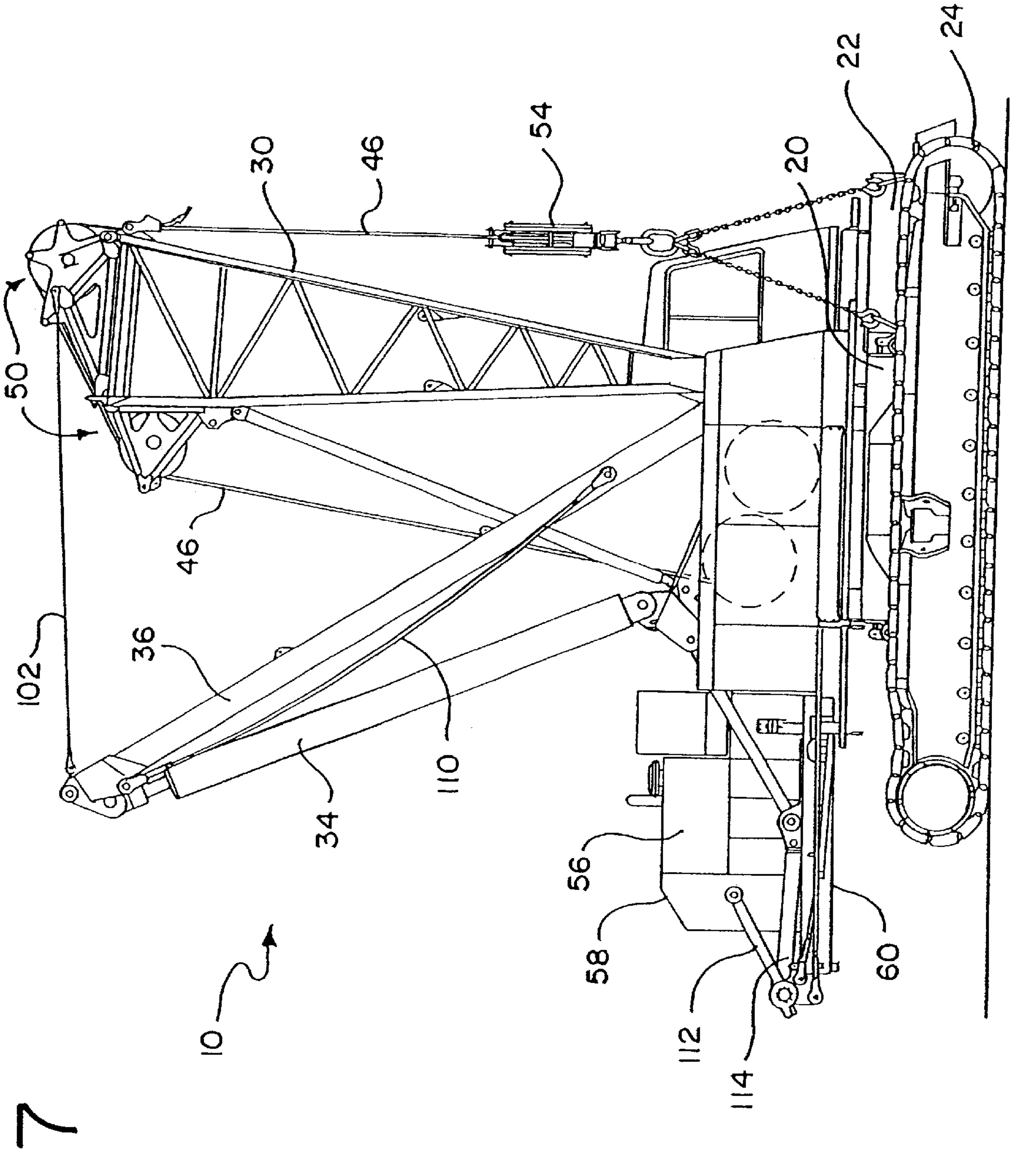
Figure 11:
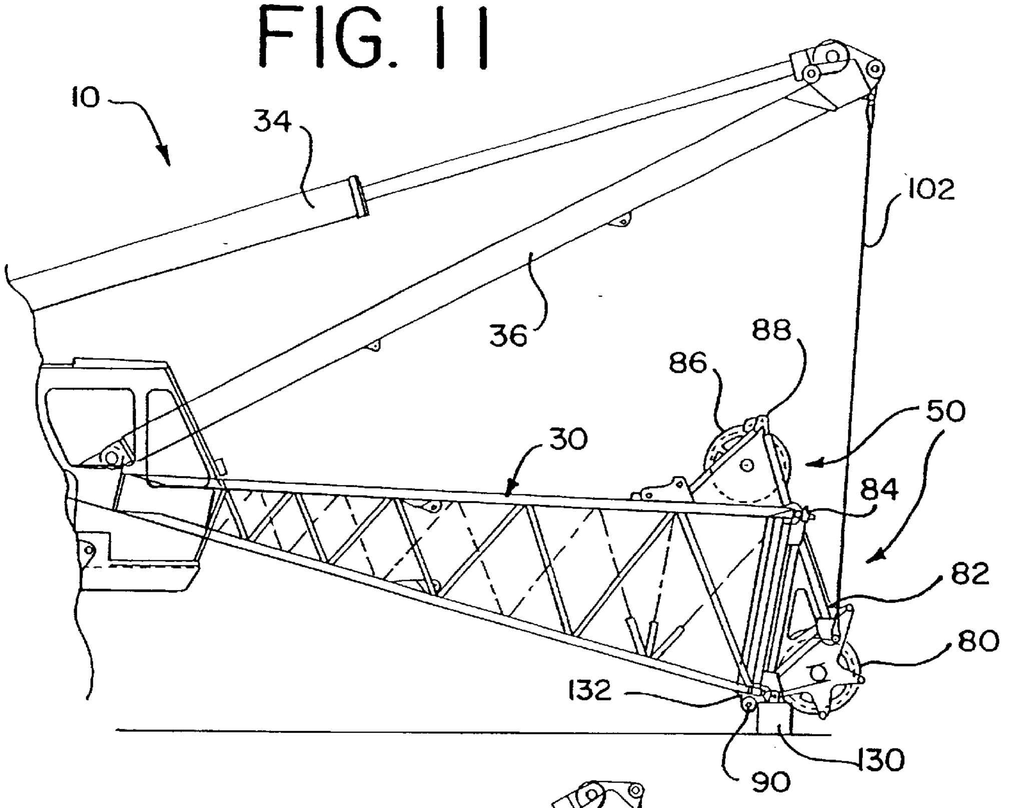
FIGS. 11–12 are partial right side elevational views of the crane in sequential stages of the wire rope guide repositioning.
Figure 12:
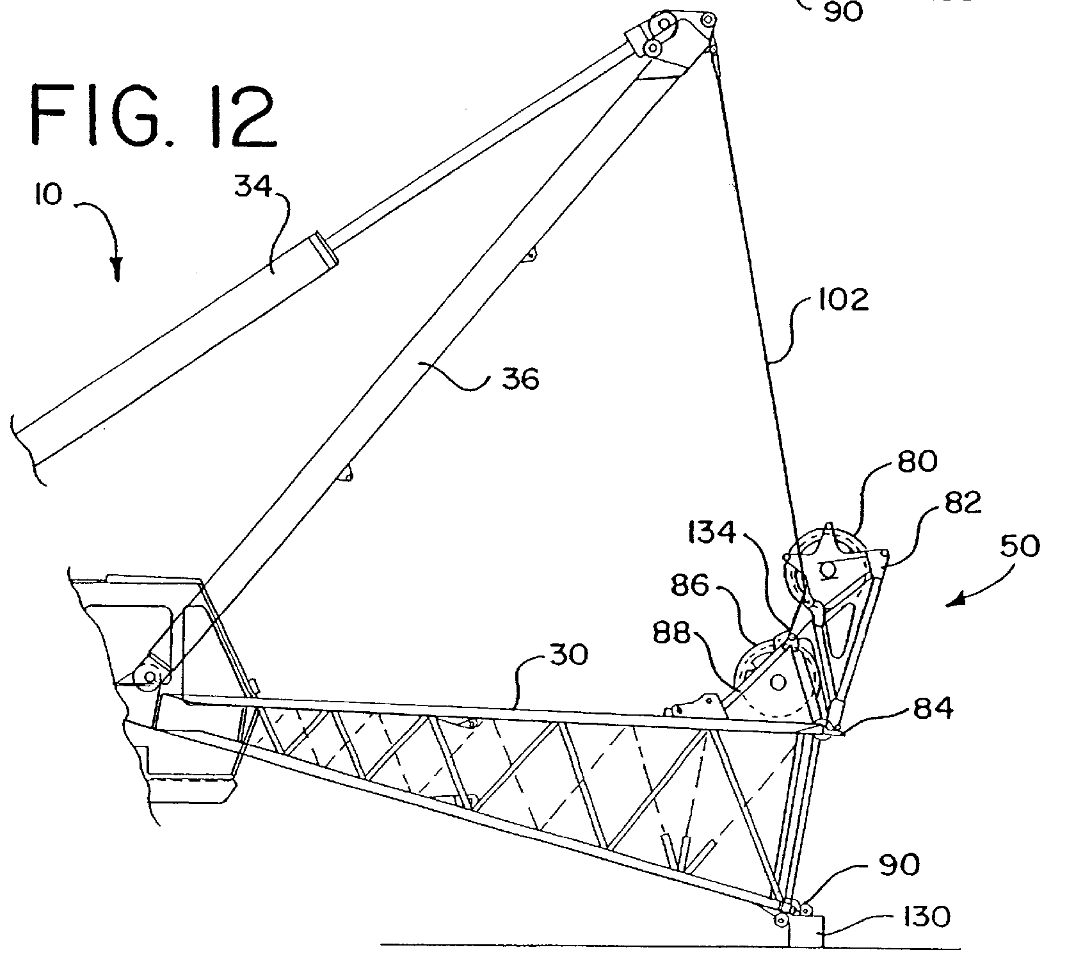

As best seen in FIGS. 11 and 12, the wire rope guide 50 comprises at least one positionable sheave 80. The positionable sheave 80 is movable between a first position on the end of the boom butt 30 (see FIG. 11) and a second position on the upper interior side of the boom butt 30 (see FIG. 12). As will be described in greater detail below in connection with the preferred method of assembling the crane 10, locating the positionable sheave 80 in the first position on the end of the boom butt 30 allows a load hoist line 46 to be used for lifting objects prior to assembling the boom top 28 and any boom inserts 32 to the boom butt 30 of the crane 10. When in this position (as best seen in FIGS. 5–7), the wire rope guide 50 prevents the load hoist line 46 from interfering with the lattice structure of the boom butt 30 by guiding the load hoist line 46 around the end of the boom butt 30. The wire rope guide 50 also minimizes eccentric loading of the boom butt 30 when using the load hoist line 46 to lift objects.

When the boom top 28 and any boom inserts 32 are assembled to the crane 10, the positionable sheave 80 is located on the upper interior side of the boom butt 30 (see FIG. 1). When in this position (see FIG. 1), the wire rope guide 50 prevents the load hoist lines 46 from interfering with the boom 26 by maintaining a separation between the load hoist lines 46 and the boom top 28 and any boom inserts 32 irrespective of the boom angle.

Figure 17:
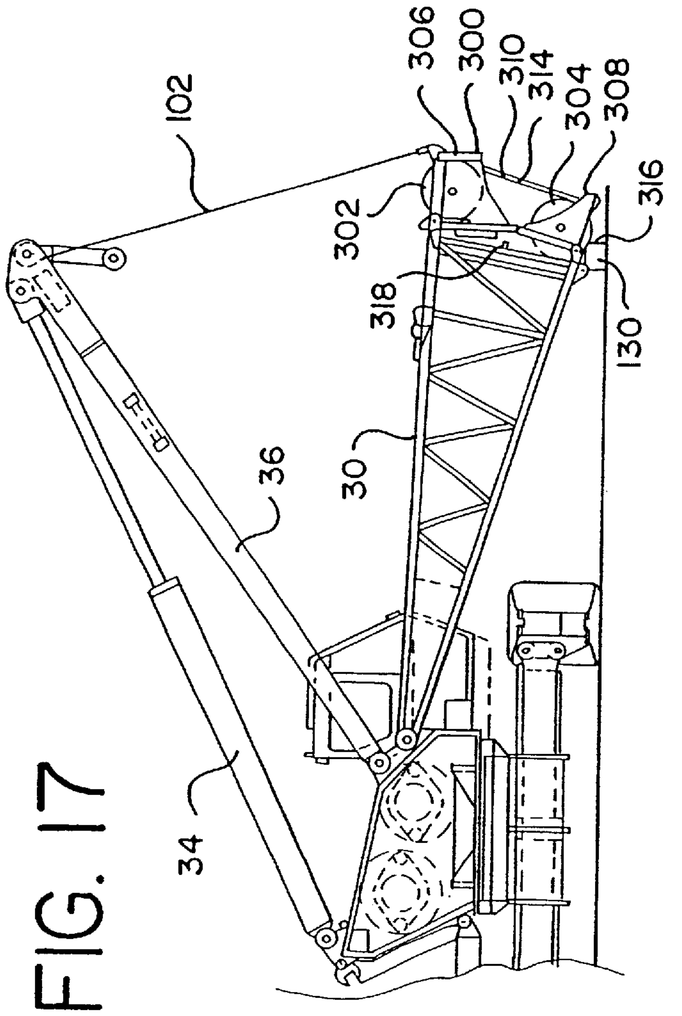
FIGS. 17–20 are partial right side elevational views of the crane in sequential stages of the repositioning of an alternative embodiment a wire rope guide.

As best seen in FIGS. 11 and 12, the positionable sheave 80 is supported by a pivotal frame 82 pivotally connected to the boom butt 30 at or near the interior edge 84 adjoining the upper interior side and the end of the boom butt 30. The wire rope guide 50 of the preferred embodiment also comprises a stationary sheave 86 located on the upper interior side of the boom butt 30. The stationary sheave 86 is supported by a stationary frame 88 attached to the interior side of the boom butt 30. The stationary frame 88 also supports the pivotal frame 82 when the positionable sheave 80 is in the second position on the upper interior side of the boom butt 30 (as shown in FIG. 12). When the positionable sheave 80 is in the first position on the end of the boom butt 30, the pivotal frame 82 is connected to the end of the boom butt 30 at or near the exterior edge 90 adjoining the upper exterior side and the end of the boom butt 30 (see FIG. 11). An alternative embodiment of a positionable wire rope guide, also called a load hoist line guide, is shown in FIGS. 17–20. As best seen in FIG. 17, the wire rope guide 300 of the alternative embodiment is comprised of a first sheave 302 and a second sheave 304. The first sheave 302 is supported by a first frame 306 and the second sheave 304 is supported by a second frame 308. The first frame 306 is pivotally connected to one edge of the end of the boom butt 30. The first frame 306 is also pivotally connected to the second frame 308. The second frame 308 is removably connected to the opposite edge of the end of the boom butt 30 when the wire rope guide 300 is positioned on the end of the boom butt 30. In the alternative embodiment shown, a collapsible strut 310 is connected between the first frame 306 and the second frame 308 to maintain rigidity between the first sheave 302 and the second sheave 304 when the wire rope guide 300 is positioned on the end of the boom butt 30. A rigging platform 312 is also provided on the first frame 306 (see FIG. 20).

Figure 8:
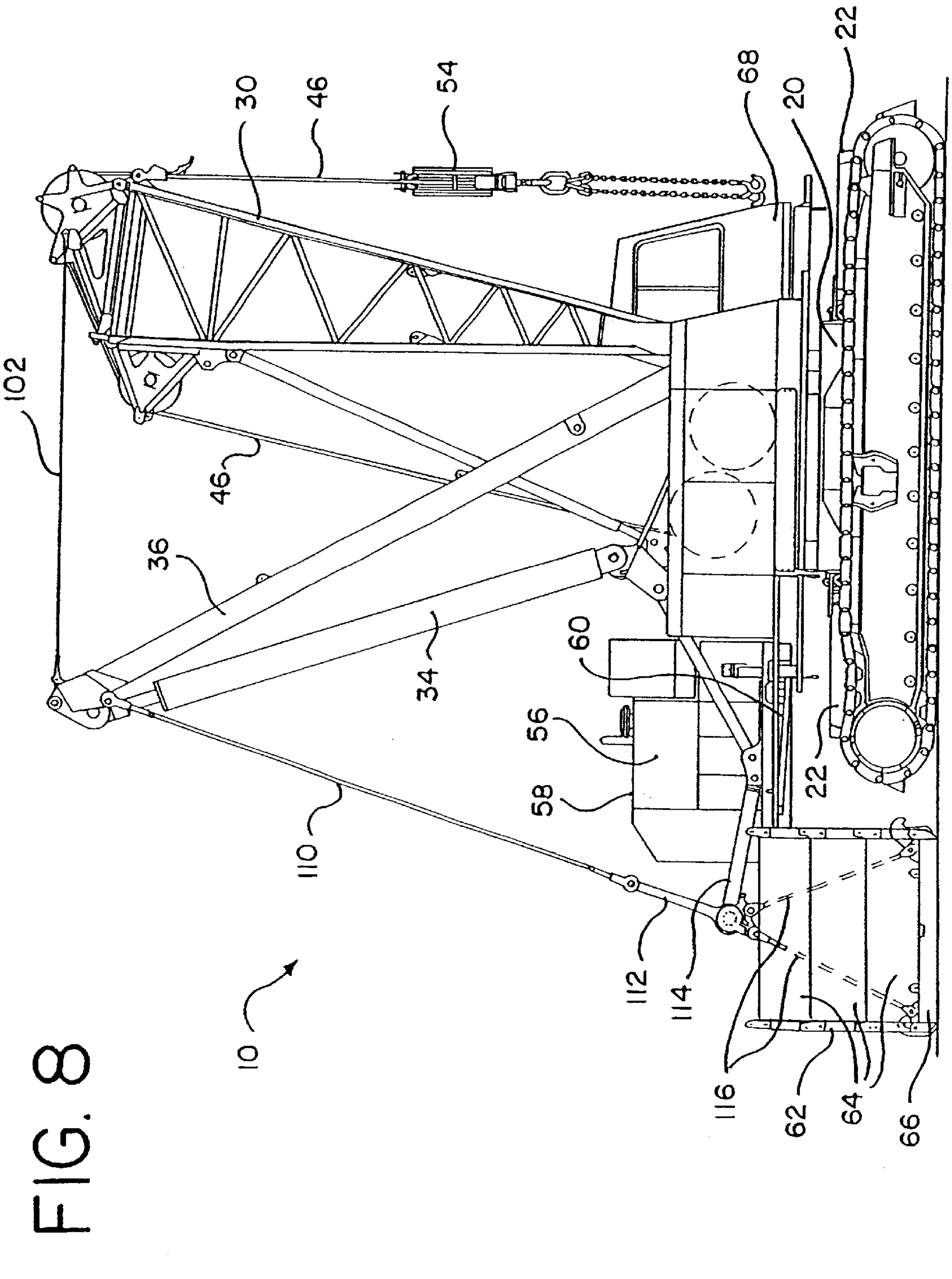
FIGS. 8–10 are right side elevational views of the crane in sequential stages of upper counter weight assembly.
Figure 16:
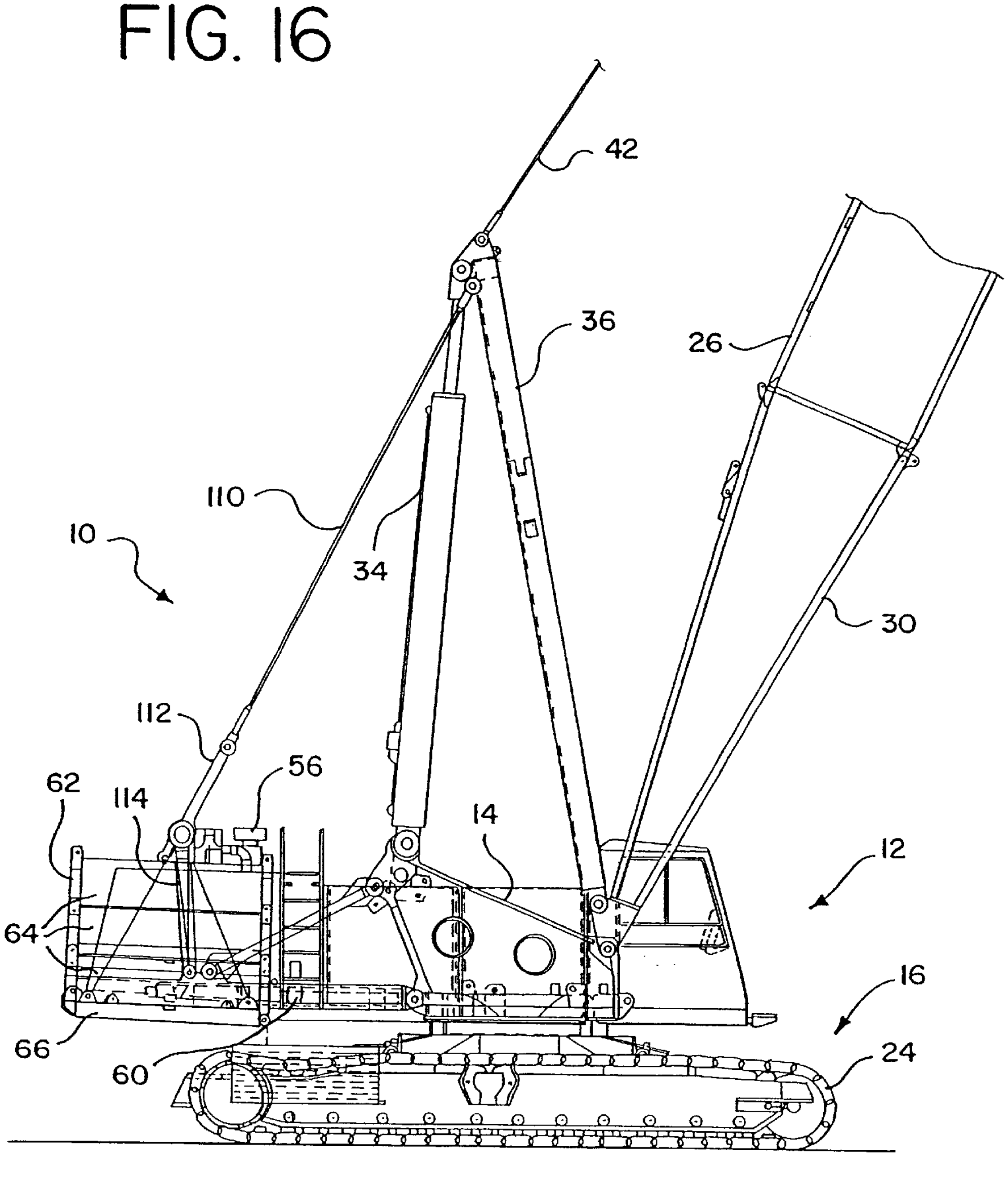
FIG. 16 is a partial right side elevational view of the crane with a boom parking device engaged.

The crane 10 of the preferred embodiment also comprises a self-handling system for assembling and disassembling the upper counter weight assembly 62. As best seen in FIG. 8, the upper counter weight assembly 62 self-handling system comprises a pair of counter weight pendants 110 connected to a counter weight pivot frame 114 by a pair of links 112. The function of these components will be discussed in greater detail below with respect to the procedure for self-assembly the crane 10 of the preferred embodiment. However, these components are also used as a boom 26 parking device. As shown in FIG. 16, the angle of the boom 26 can be secured while the crane 10 is not in use by connecting the counter weight pendants 110 to the links 112. The links 112 and the counter weight pivot frame 114 are both connected to the upper counter weight assembly 62, which in turn is connected to the power plant base 60. These connections are discussed in greater detail below with respect to the procedure for self-assembly the crane of the preferred embodiment. Once the counter weight pendants 110 are connected, the pressure in the hydraulic boom hoist cylinders 34 can be released to permit the weight of the boom 26 to be carried by the upper counter weight assembly 62 and the power plant 56, thereby eliminating the need to maintain a constant pressure in the hydraulic boom hoist cylinders 34 to maintain the angle of the boom.

The preferred method of self-assembling the boom hoist cylinder crawler crane 10 is best seen by referring to FIGS. 3–15 and the description above.

Referring to FIG. 3, the disassembled boom hoist cylinder crawler crane 10 is delivered to the job site on a transport trailer 100. Additional components, such as the boom top 28, any boom inserts 32, the crawlers 24, the car body counter weights 22, and the upper counter weight assembly 62, are delivered on separate transport trailers (not shown) prior to their assembly to the crane 10.

Referring to FIGS. 3–4, the pistons 38 of the hydraulic boom hoist cylinders 34 are retracted to raise the hydraulic boom hoist cylinders 34 and the mast 36 up off of the transport trailer 100. A boom butt pendant 102 is then connected between the end of the boom butt 30 and the mast 36. In the preferred method of self-assembly, the wire rope guide 50 is initially positioned on the end of the boom butt 30. One end of the boom butt pendant 102 is then connected to the mast 36 at a point near the connection between the mast 36 and the boom hoist cylinders 34. The other end of the boom butt pendant 102 is then connected to the pivotal frame 82 of the wire rope guide 50. When not in use, the boom butt pendant 102 remains connected to, and is stowed on, the mast 36. The hydraulic boom hoist cylinders 34 are then retracted an additional distance to raise the boom butt 30 off of the transport trailer 100 (FIG. 4).

A plurality of jacking cylinders 104 attached to the car body 20 are swung into a position straddling the transport trailer 100. The jacking cylinders 104 are then extended to raise the car body 20 off of the transport trailer 100. The transport trailer 100 can then be removed.

Referring to FIGS. 5–6, a load hoist line 46 is reeved around the stationary sheave 86 and the positionable sheave 80 of the wire rope guide 50. A hook block 54 is rigged to the load hoist line 46. The end of the load hoist line 46 is connected to boom butt 30. The load hoist line 46 and the hydraulic boom hoist cylinders 34 are now used to remove the crawlers 24 from a transport trailer 100 and position them for attachment to the car body 20. The hook block 54 can be raised or lowered by rotating the load hoist line drum 48 to either pay out or retract the load hoist line 46. The angle of the boom butt 30 can be changed by either extending or retracting the hydraulic boom hoist cylinders 34, thereby moving an object attached to the hook block 54 further from or closer to the crane 10. The position of the upper works 12 relative to the car body 20 is controlled through rotation of the swing bearing 18. Once a crawler 24 has been properly positioned, it is then attached to the car body 20. A method and apparatus for assembling the crawlers 24 to the car body 20 are disclosed in U.S. Pat. No. 5,427,256. Another method of assembling the crawlers 24 to the car body 20 is disclosed in U.S. patent application Ser. No. 08/469,194.

After both crawlers 24 have been attached to the car body 20, the jacking cylinders 104 can then be retracted to lower the crane 10 onto the ground. The jacking cylinders 104 are then stored against the side of the car body 20. In the alternative, the jacking cylinders 104 can be removed from the crane 10.

Referring to FIG. 7, the crane 10 may now be used to position other crane components for assembly to the crane 10. For example, the load hoist line 46 and the hydraulic boom hoist cylinders 34 can be used to position and assemble the car body counter weights 22 to the car body 20.

The hydraulic boom hoist cylinders 34 are also used to assemble the upper counter weight assembly 62 to the upper works 12. As best seen in FIG. 8, the crane 10 is used to lift the upper counter weight assembly 62 off of a transport trailer (not shown) and place it on the ground behind the crane 10. A pair of counter weight pendants 110 are then each attached to a link 112 connected to each side of the counter weight pivot frame 114. One end of each counter weight pendant 110 is pinned to the mast 36 at a point near the connection between the hydraulic boom hoist cylinder 34 and the mast 36. When not in use, the counter weight pendants 110 remain connected to, and are stowed on, the mast 36 (see FIG. 7).

The counter weight pivot frame 114 of the preferred embodiment is comprised of a U-shaped frame having the legs of the "U" connected between the power plant base 60 and the upper counter weight assembly 62. The cross-member which is connected between the legs of the U-shaped frame provides rigidity to the structure. Alternatively, the counter weight pivot frame 114 is comprised of a pair of struts, one strut being pivotally connected to each side of the power plant base 60.

As best seen in FIG. 8, the upper counter weight assembly 62 of the preferred embodiment comprises a plurality of counter weights 64 supported on a counter weight tray 66. Attached to the interior of each side of the counter weight tray 66 is a plurality of pendants 116.

In the preferred method of self-assembly, the crane 10 is maneuvered to align the counter weight pivot frame 114 with the upper counter weight assembly 62. The counter weight pivot frame 114 is then pinned to the pendants 116 attached to the counter weight tray 66 (see FIG. 8).

Figures 9, 9A, 9B:
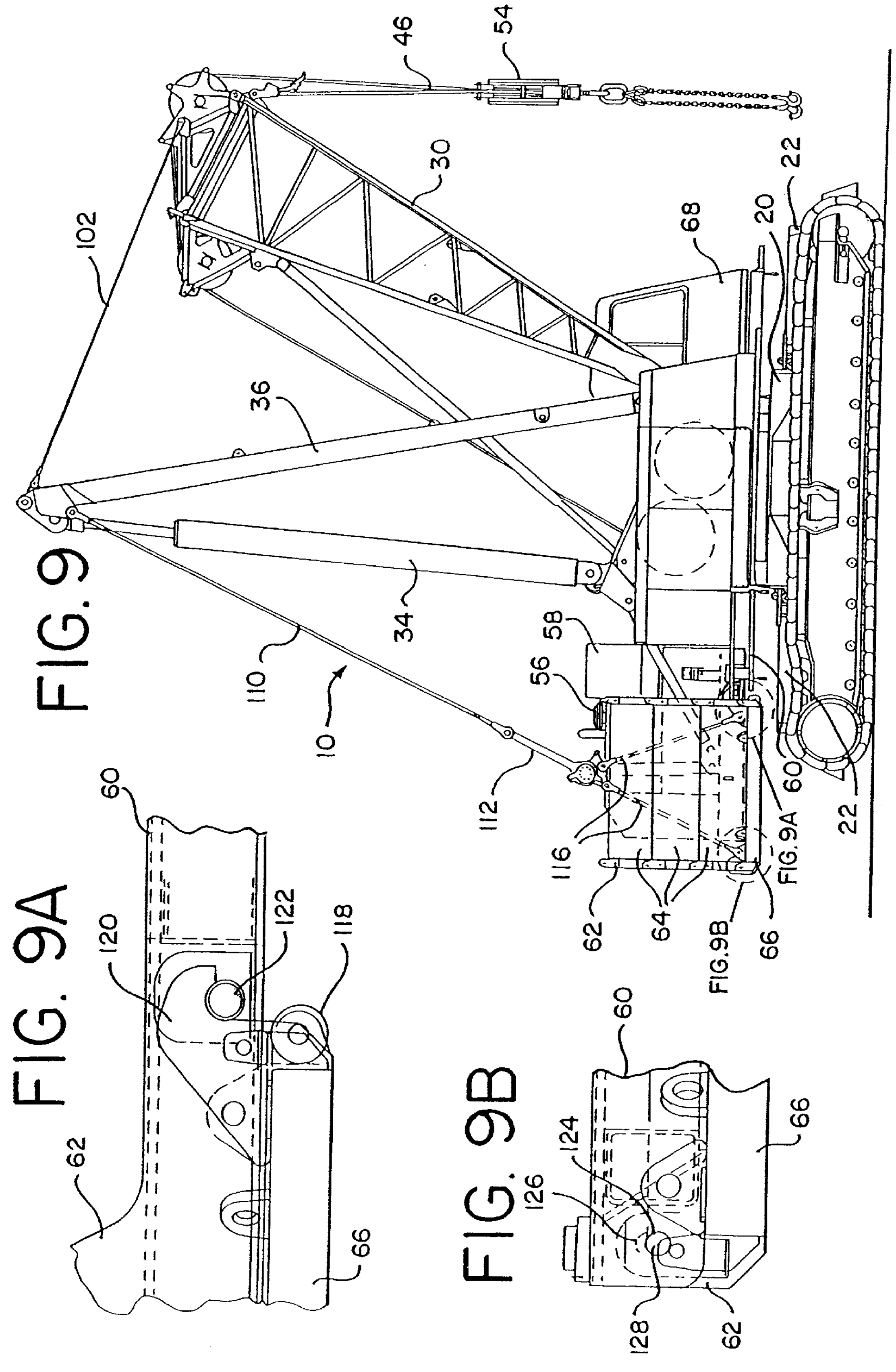
Figure 10:
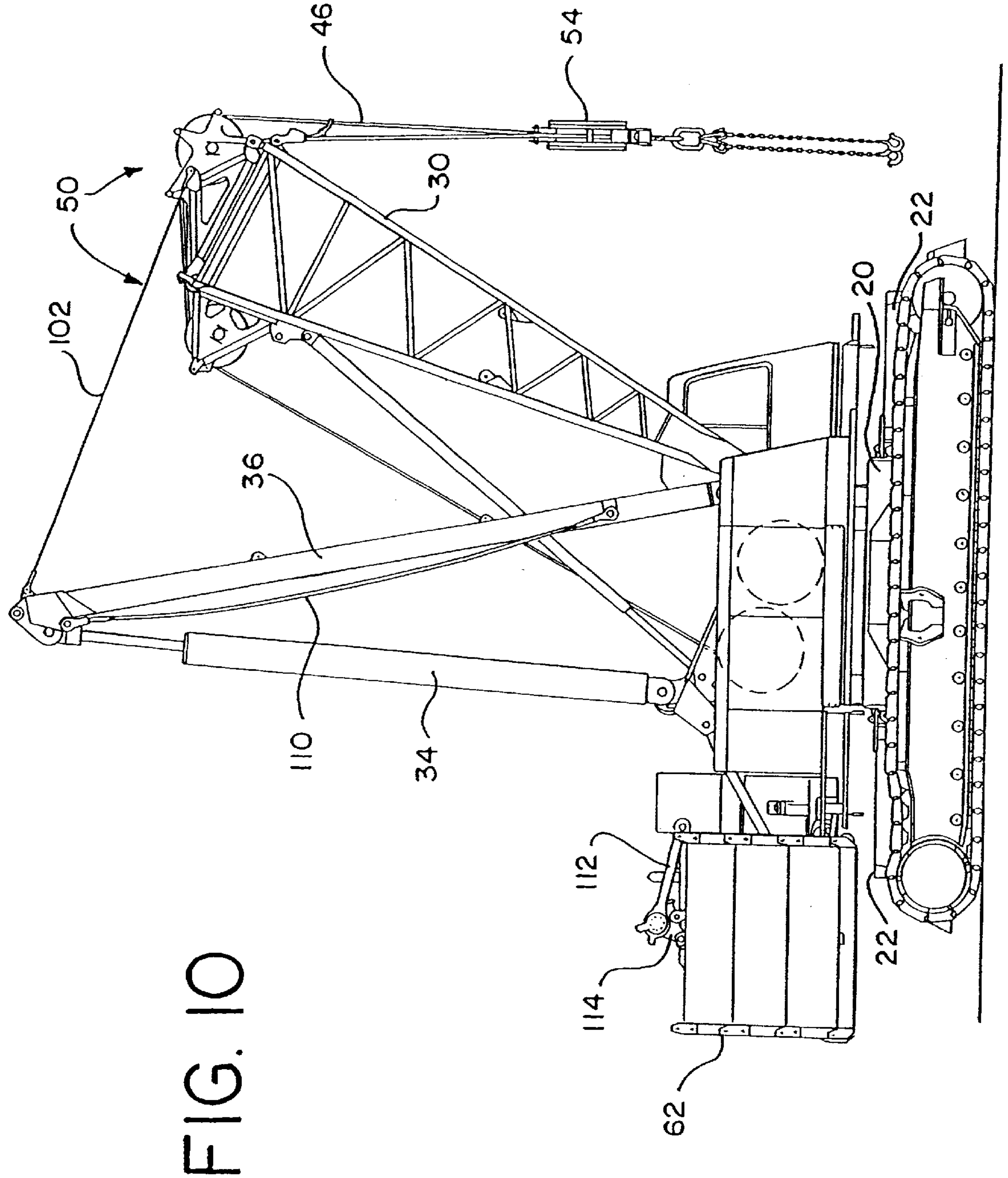

As best seen in FIG. 9, the hydraulic boom hoist cylinders 34 are then extended to lift the upper counter weight assembly 62 off of the ground. As the upper counter weight assembly 62 is lifted upwards by the hydraulic boom hoist cylinders 34, the counter weight pivot frame 114 swings the upper counter weight assembly 62 through a vertical arc about the axis of the connection of the counter weight pivot frame 114 to the upper works 12. The connection of the pendants 116 to the counter weight pivot frame 114 is forward of the center of gravity of the upper counter weight assembly 62 such that upper counter weight assembly 62 tilts toward the rear of the crane 10 when suspended by the pivot frame 114.

As the upper counter weight assembly 62 is lifted into its operating position on the rear of the upper works 12, a roller 118 engages the underside of the power plant base 60 (see FIG. 9A). As the hydraulic boom hoist cylinders 34 are extended further, the roller 118 guides the upper counter weight assembly 62 forward until a hook 120 on each side of the counter weight tray 66 engages a pin 122 on each side of the power plant base 60. The reward tilt of the suspended upper counter weight assembly 62 permits the hooks 120 to clear the pins 122 during the lifting operation. Once the hooks 120 engage the pins 122, the hydraulic boom,hoist cylinders 34 are extended further until a pinning hole 124 located near the rear of each side of the counter weight tray 66 is aligned with an oval shaped hole 126 located on each side of the power plant base 60 (see FIG. 9B). A limit switch (not shown) prevents the hydraulic boom hoist cylinders 34 from being over extended. A pin 128 is then placed through the each pinning hole 124 and oval shaped hole 126 to secure the upper counter weight assembly 62 to the power plant base 60. Once the pins 128 are in place, the hydraulic boom hoist cylinders 34 are retracted to remove the tension in the counter weight pendants 110 and the links 112. The counter weight pendants 110 are then disconnected from the links 112 and stowed on the mast 36. Likewise, the links 112 are stowed on the power plant base 60.

In the preferred method of assembly, at least one of the car body counter weights 22 are assembled to the car body 20 prior to assembling the upper counter weight assembly 62 to the upper works 12 to add stability to the crane 10. Installation of the second car body counter weight 22 may interfere with the installation of the upper counter weight assembly 62 to the upper works 12. If only one of the car body counter weights 22 was installed prior to assembly of the upper counter weight assembly 62 to the upper works 12, then the second car body counter weight 22 should be installed at this stage of the crane self-assembly method.

Referring to FIGS. 11–12, the wire rope guide 50 is relocated from a first position on the end of the boom butt 30 to a second position on the upper interior side of the boom butt 30. As best seen in FIG. 11, the hydraulic boom hoist cylinders 34 are extended to rest the boom butt 30 on the ground. Blocking 130 is placed under the exterior edge 90 of the boom butt 30 to prevent the ground from interfering with the wire rope guide 50. The hook block 54 and the load hoist line 46 are then derigged and removed from the wire rope guide 50. A pin 132 which connects the pivotal frame 82 to the exterior edge 90 of the boom butt is then removed. The hydraulic boom hoist cylinders 34 are then retracted to raise the pivotal frame 82 in an upward arc about the pivotal connection of the pivotal frame 82 to interior edge 84 of the boom butt 30. As shown in FIG. 12, the pivotal frame 82 is positioned adjacent to the stationary frame 88. The pivotal frame 82 is then connected to the stationary frame 88 by installing a pin 134 through holes in the pivotal frame 82 and the stationary frame 88.

Figure 18:
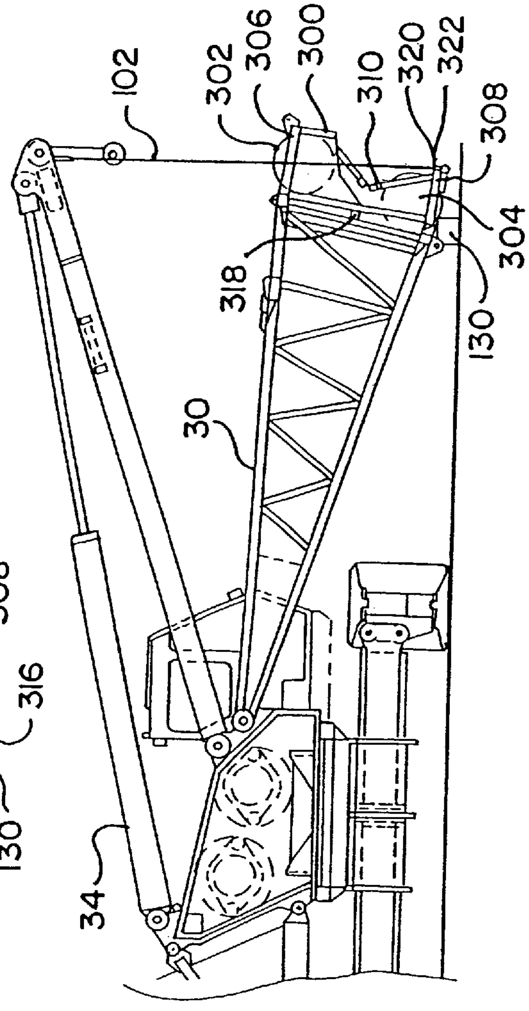

The alternative embodiment of the positionable wire rope guide 300 shown in FIGS. 17–20 is relocated through a similar procedure. As shown in FIGS. 17–18, pin 314 is removed from the collapsible strut 310 to allow the strut 310 to fold. Pin 316 is then removed to release the connection between the second frame 308 and the end of the boom butt 30. The hydraulic boom hoist cylinders 34 are then extended to allow the first frame 306 to swing downwardly against the stop 318.

Referring to FIGS. 17–18, the boom butt pendant 102 is disconnected from the first frame 306 and reconnected to a lifting link 320 on the second frame 308. A lifting link pin 322, which secures the lifting link 320 when not in use, is removed to allow the lifting link 320 to pivot with the boom butt pendant 102. The hydraulic boom hoist cylinders 34 are then retracted to draw the second frame 308 upwards towards the first frame 306 by swinging the second frame 308 about the pivotable connection between the first frame 306 and the second frame 308. The collapsible strut 310 is simultaneously folded as the second frame 308 is raised.

Figure 19:
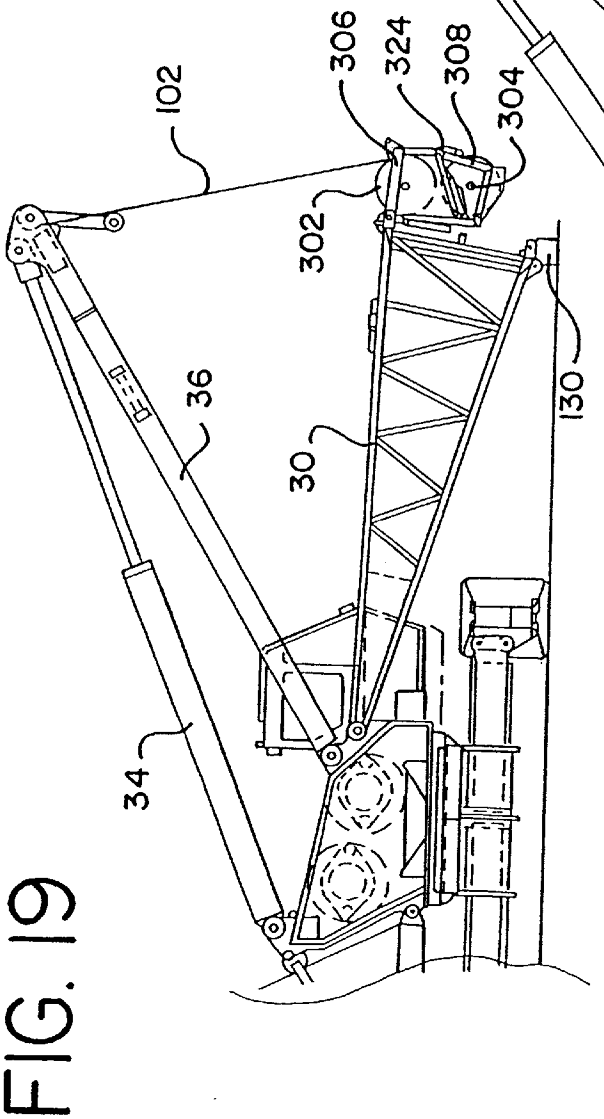

Referring to FIG. 19, the second frame 308 is raised to a position next to the first frame 306. Pin 324 is then installed to rigidly connect the second frame 308 to the first frame 306. The hydraulic boom hoist cylinders 34 are further retracted to swing the wire rope guide 300 upwardly until it flips over center.

Figure 20:
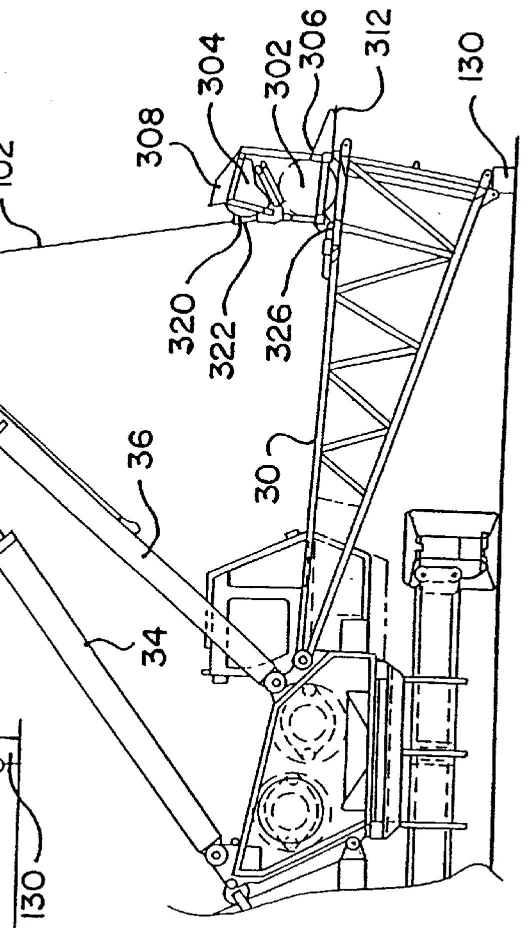

Referring to FIG. 20, the wire rope guide 300 is then lowered on to the upper interior side of the boom butt 30 by extending the hydraulic boom hoist cylinders 34. Pin 326 is then installed to rigidly connect the first frame 306 of the wire rope guide 300 to the upper interior side of the boom butt 30. The rigging platform 312 is then lowered into position.

Figure 13:
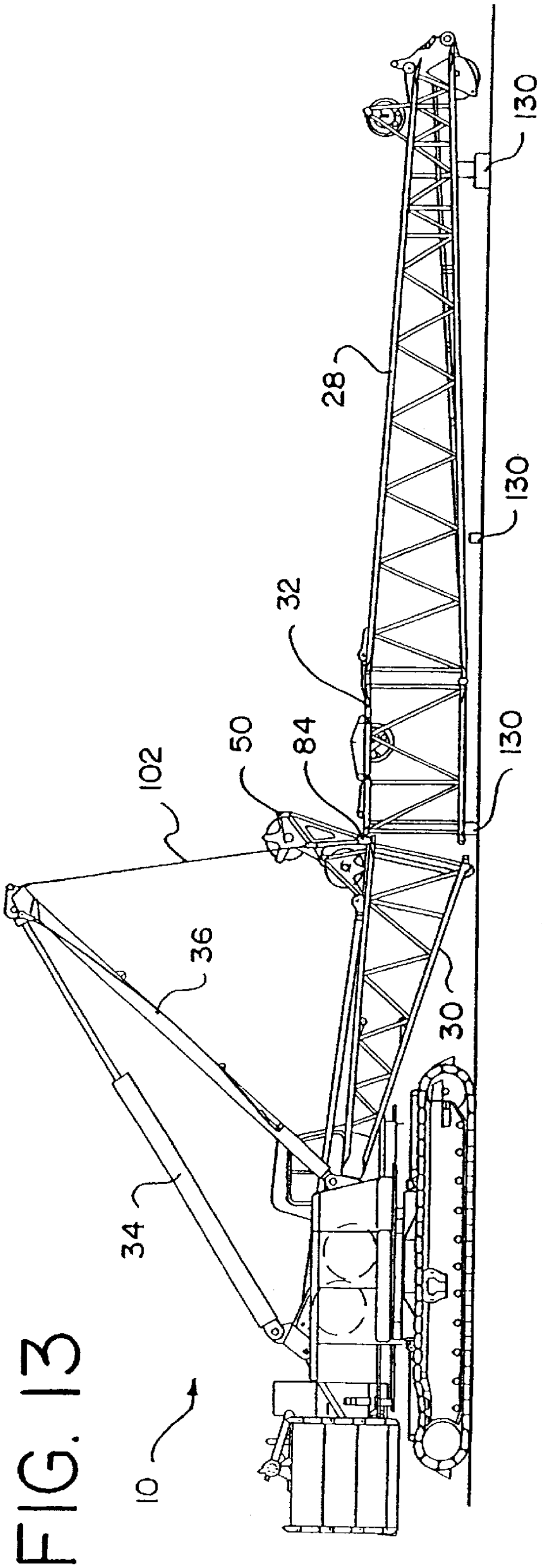
FIGS. 13–15 are right side elevational views of the crane in sequential stages of boom top and boom insert assembly.

Referring to FIG. 13, the boom top 28 and any boom inserts 32 are assembled together on the ground adjacent to the boom butt 30. Blocking 130 is typically used to support the boom top 28 and the boom inserts 32 during the assembly process. The assembled boom top 28 and boom inserts 32 are then connected to the interior edge 84 of the end of the boom butt 30. The connections between the boom butt 30, the boom top 28, and any boom inserts 32 can be one or more of the connections shown in U.S. Pat. No. 5,199,586.

Figure 14:
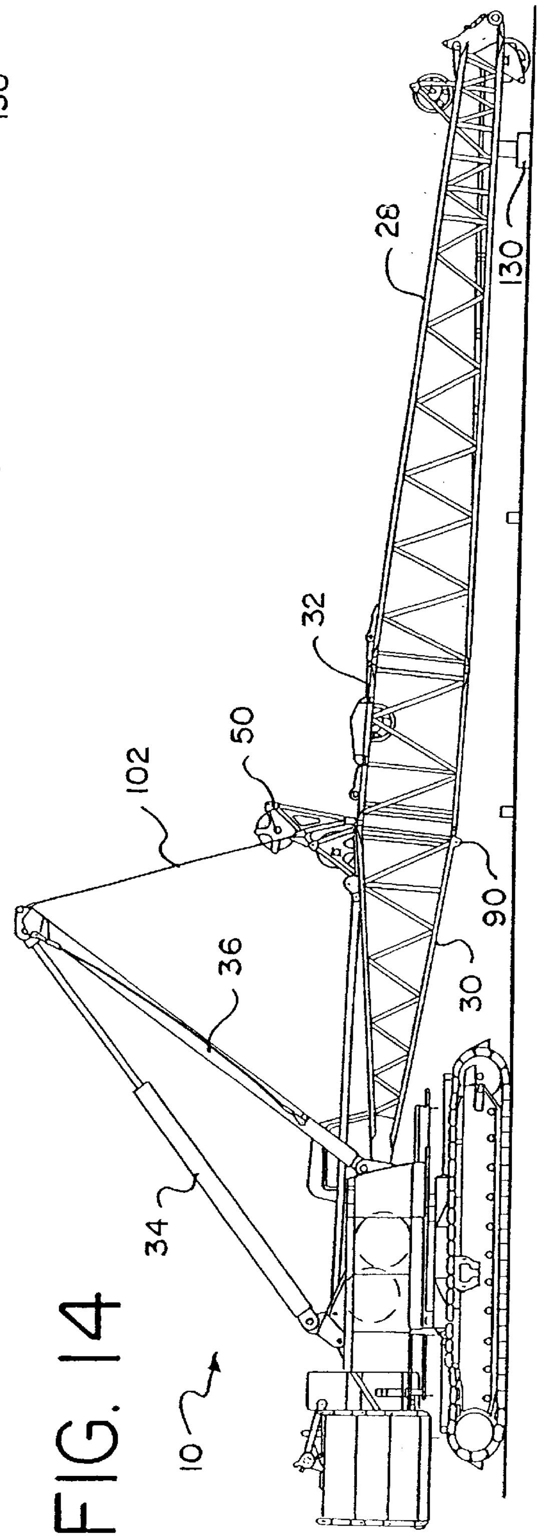

Referring to FIG. 14, the hydraulic boom hoist cylinders 34 are retracted to lift the boom 26 to align the axis of the boom butt 30 with the axis of the assembled boom top 28 and any boom inserts 32. The exterior edge 90 of the end of the boom butt 30 is then connected to the assembled boom top 28 and any boom inserts 32 to complete the assembly of the boom 26.

Figure 15:
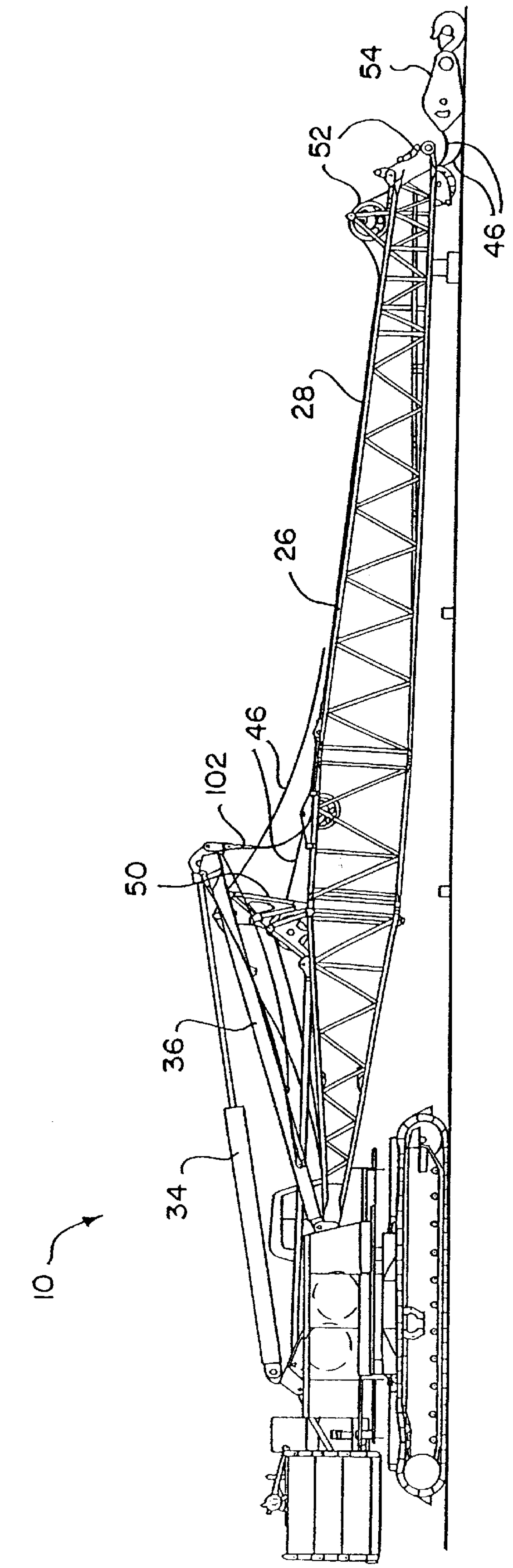

Referring to FIG. 15, the boom butt pendant 102 is disconnected and preferably stowed on the mast 36. The boom pendants 42 are then connected between the mast 36 and the boom top 28. The load hoist lines 46 are then passed through the wire rope guide 50 and reeved around the boom top sheaves 52. Finally, one or more hook blocks 54 are rigged to the load hoist lines 46 (as seen in FIG. 1).

Self-disassembly of the crane 10 is accomplished by following the method described above in reverse order. Normally, double-acting cylinders like cylinders 34 are powered by open loop pumps, because the rod end of the cylinder takes less fluid to move the piston than is displaced out of the piston end of the cylinder. Open loop pumps draw hydraulic fluid from a reservoir and fluid is returned from the cylinder to the reservoir. The volume differential between the rod end and the piston end of the cylinder can thus be easily accommodated.

Figure 21:
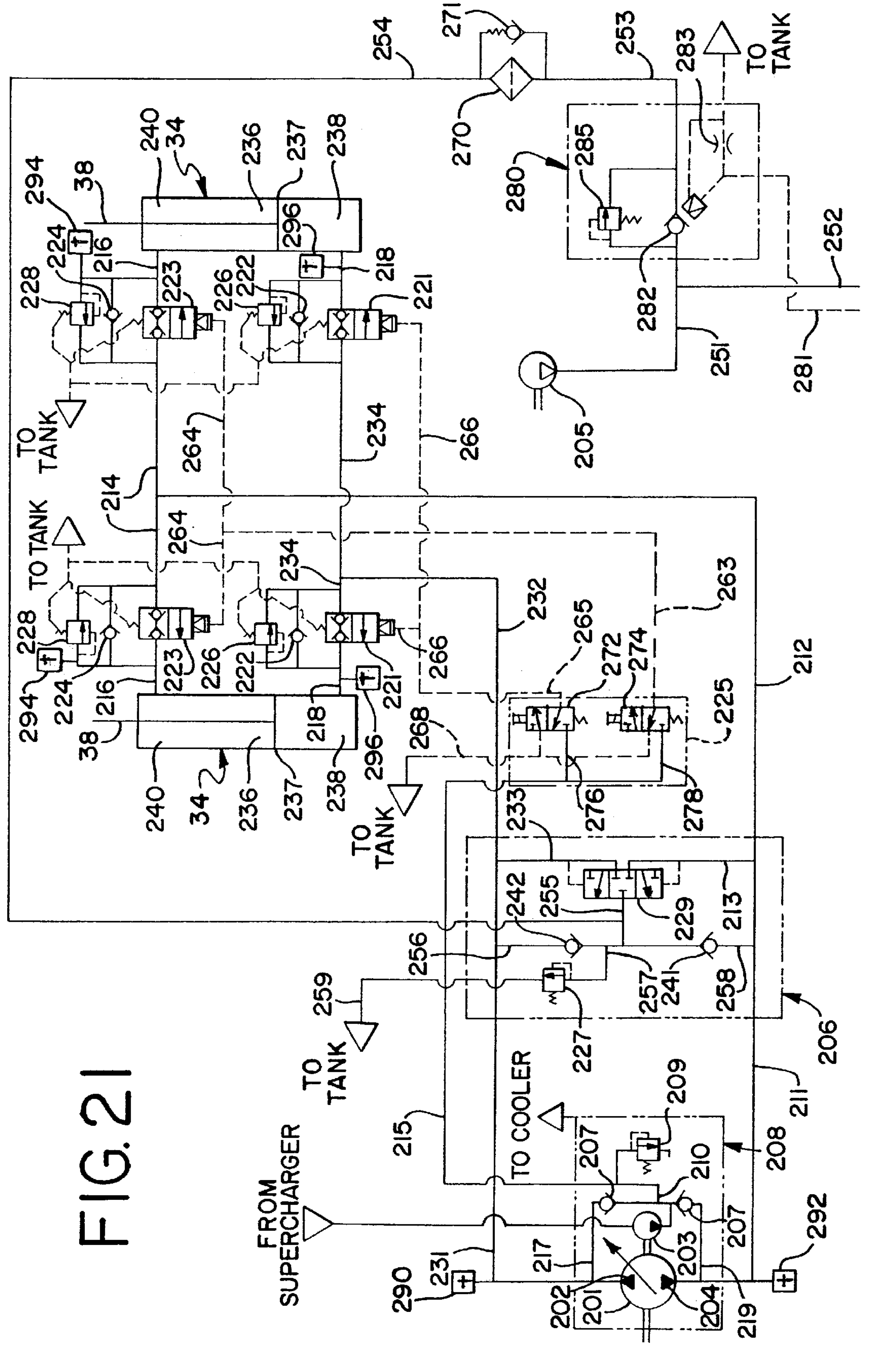
FIG. 21 is a schematic of the hydraulic circuit which controls the hydraulic boom hoist cylinders.

However, open loop pumps are not as power efficient as closed loop pumps, and turn much slower, delivering lower flow rates, than comparable closed loop pumps. Also, comparable horsepower open loop pumps are more expensive than closed loop pumps. Larger displacement open loop pumps generally require super charging the inlet either by pressurizing the reservoir or with a secondary pump. The super charging pump must have the same flow rate as the main open loop pump. Because of these drawbacks, a unique hydraulic circuit using a closed loop pump was developed for crane 10. The hydraulic circuit is shown in FIG. 21. As explained above, the hydraulic cylinders 34 are preferably double-acting cylinders and are used during normal crane operations to control the boom angle, and during crane set up operations, particularly when installing the upper counterweight assembly 62. When used to control the boom angle during normal lifting operations, the cylinders 34 are generally in tension. During the counterweight positioning operation, the cylinders 34 are in compression. As a result, the cylinders are sometimes controlled to move in a direction that is natural for them to follow under the loads then being imposed. In this situation, the pump is handling an overhauling load. That is, the pump is motoring, or driving the diesel engine typically used to drive the pump. In the preferred circuit, the pump is subject to overhauling loads sometimes when the cylinders are extending and sometimes when the cylinders are retracting.

The major components of the circuit include the closed loop pump 201, the double-acting cylinders 34, a charge pump 203, an auxiliary pump 205, also referred to as an accessories pump because it is also used to power auxiliary hydraulic accessories, a cylinder directional control valve assembly represented by dotted line 225, and a replenish-hot oil manifold, represented by dotted line 206, which incorporates a relief valve 227 and a hot oil shuttle valve 229. The preferred directional control valve assembly 225 includes two solenoid controlled, spring biased two position valves 272 and 274. The preferred replenish hot oil manifold 206 contains a hot oil shuttle valve 229, preferably Model No. DSGH-XHN, a relief valve 227, preferably Model No. RPGC-LNN, and two check valves 241 and 242, preferably Model No. CXFA-XAN, all in the form of cartridges that screw into the manifold. The cartridges are from Sun Hydraulics.

The closed loop pump 201 and charge pump 203, and the other components within dotted line 208, are preferably all built-in components on a commercially available variable displacement pump, such as the Series 90 pump from Sauer Sundstrand Corporation, Model No. 90 L 100 KA 2 C 853 FI E 33 6BA 20 42 24. This pump incorporates a swashplate as a directional flow controller so that either of the two ports 202 and 204 of the pump 201 can be alternatively used as the discharge and intake ports. Alternatively, a closed loop pump with unidirectional flow could be coupled to a separate directional flow controller to interchangeably provide power to both sides of the cylinders 34. The preferred closed loop pump includes internal safety relief valves and other features which are not shown in FIG. 21 because they are conventional and form no part of the present invention.

The cylinders 34 are preferably identical. As a result, the same reference numbers are used to refer to the same parts of the cylinders 34. Each cylinder 34 has a bore 236 and a piston 237 mounted in the bore 236, forming a piston end 238 of the cylinder 34. A rod 38 is connected to the piston 237 opposite the piston end 238. The rod 38 extends out of an exit end of the bore 236 but is sealed at the exit end, forming a rod end 240 of the cylinder. A first passageway 218 is in fluid communication with the piston end 238, and a second passageway 216 is in fluid communication with the rod end 240 of the cylinder 34. As shown in FIG. 21, the bore 236 has a constant internal diameter throughout its length. The piston 237 and rod 38 are both solid. The piston end 238 has an effective cross-sectional area equal to the cross-sectional area of the bore 236. Because of the presence of the rod 38, the rod end 240 has an effective cross-sectional area that is less than the effective cross-sectional area of the piston end 238.

When the boom 26 is raised, the cylinders 34 are retracted. The closed loop variable displacement pump 201 is brought on stroke to pressurize lines 211, 212, 213 and 214. Fluid is allowed to enter passageway 216 into the rod end 240 of each cylinder 34 through check valves 224. The boom hoist directional control valve assembly 225 is electrically actuated to the boom up position in which flow from the charge pump 203 in lines 210, 215 and 276 passes through the valve 272 and out lines 265 and 266 to the pilot operated valves 221 mounted on each cylinder 34. The pilot signal opens the pilot operated valves 221, allowing hydraulic fluid to pass out of the cylinder bores 236 through passageways 218. Lines 234, 232 and 231 return the fluid to port 202 of pump 201.

As the circuit is designed with a closed loop variable displacement pump, the flow in the lines into and out of the cylinders 34 must be equal at the pump 201. It would be best if the ratio of the change in volume of the rod end to the change in volume of the piston end as the rod is extended or retracted is between about 1:2 and about 1:1.1. In the presently preferred embodiment of the crane 10, the rod 38 has a diameter of 5.5 inches and a cross sectional area of 23.8 square inches. The bore 236 has a diameter of 12 inches, and a cross sectional area of 113.1 square inches. The preferred ratio of the change in volume of the rod end 240 to the change in volume of the piston end 238 is thus (113.1-23.8):113.1, or 1:1.27. Thus, for one gallon of hydraulic fluid forced into passageway 216, 1.27 gallons of hydraulic fluid comes out passageway 218. The extra 0.27 gallons is drained from the circuit through the replenish-hot oil manifold 206 out line 259 to the hydraulic reservoir, leaving one gallon to return to port 202 of pump 201 through line 231. The excess fluid is allowed out through line 233 in the replenish hot oil manifold 206. The shuttle valve 229 is actuated by the pressure in line 213 so that line 233 is connected to line 255. The fluid then passes through line 257 and relief valve 227.

When the operator wants the boom 26 to go down, the pump 201 is brought on stroke far enough to once again pressurize lines 211, 212 and 214 to a level sufficient to support the load. The boom hoist directional valve assembly 225 is electrically actuated to the boom down (extend) position in which flow from the charge pump 203 passes through lines 210, 215 and 278, then through the valve 274, and out lines 263 and 264 to the pilot operated valves 223 mounted on each cylinder. The pilot signal opens the pilot operated valves 223, allowing hydraulic fluid to pass out of the rod end 240 of the cylinders 34 through passageways 216. At this time, the flow direction of the pump 201 is reversed, and port 202 becomes the discharge port of pump 201. Flow passes through lines 231 and 234, check valve 222, and passageway 218, causing the rod 38 to extend. However, because the cylinder 34 is under tension, intake port 204 and lines 211 and 214 remain under high pressure.

As before, the flow into and out of each cylinder 34 must be equal at the variable displacement pump 201. However, in the boom down mode, one gallon of fluid from the rod end 240 of the cylinder 34 results in a need for 1.27 gallons to enter the piston end 238. The 0.27 gallons is made up from flow from the accessories pump 205 through the lines 251, 253 and 254 into the replenish-hot oil manifold 206, which is positioned such that flow can enter line 233 from line 255 and join with the flow in line 231 to line 232, 234 and enter piston end 238. Since the cylinder 34 is generally in tension during the boom-down operation, the lines 231, 232 and 233 are on the low pressure side of the pump 201. Hence, the make up fluid is being supplied from the accessories pump 205 to the low pressure side of the hydraulic circuit.

At very steep boom angles, the cylinders 34 may be in compression. The hydraulic circuit of FIG. 21 allows for the closed loop pump to handle extension under compressive loads as well, because as discussed above the preferred crane 10 also uses the cylinders 34 for counterweight positioning operations.

During counterweight positioning operations, the cylinders 34 are in compression. When the operator commands the cylinders to extend, lines 231, 232, 233 and 234 become the high pressure side of the circuit, feeding the piston end 238 of the cylinders 34 through check valve 222. Port 202 becomes the discharge and high pressure port on the closed loop pump 201. The boom hoist directional control valve assembly 225 is actuated so that pressure from the charge pump 203 can flow through line 215, valve 274, and lines 263 and 264 to open pilot operated valves 223, allowing fluid to exit passageways 216. In the extend mode, additional make up flow from the accessories pump 205 is brought through lines 251, 253 and 254 into the replenish-hot oil manifold 206. The pressure in line 233 causes the pilot line to operate valve 229 so that fluid may flow from line 255 into line 213 and then to join with the flow in lines 212 and 211 back to pump 201 through port 204 on the pump. Once again, the make up fluid supplied by the accessories pump 205 is fed into the low pressure side of the hydraulic circuit.

When the operator commands the cylinders to retract during a counterweight positioning operation, lines 231, 232, 233 and 234 remain the high pressure side of the circuit. Pump 201 is brought on stroke far enough to once again pressurize these lines to a level sufficient to support the load. The boom hoist directional control valve assembly 225 is electrically actuated to the retract position so that flow from the charge pump 203 in line 215 passes through valve 272 and out lines 265 and 266 to the pilot operated valves 221 mounted on each cylinder 34. The pilot signal opens the pilot operated valves 221, allowing hydraulic fluid to pass out of the piston end 238 of the cylinders 34. At this time, the flow direction of the pump 201 is reversed so that the rod 38 begins to retract. However, lines 231, 232, 233 and 234 remain the high pressure lines since the cylinder 34 is under compression. Hence port 202 is the intake port, but is still the high pressure port as well. Excess fluid from lines 212 and 214 passes out through line 213, valve 229, lines 255 and 257, relief valve 227 and line 259 to the cooler and then on to the reservoir.

The pilot operated valves 221 and 223 are mounted directly to the cylinders. In the event of a hose burst, pilot pressure is lost. The pilot operated valves then close, holding the cylinder in place. Relief valves 226 and 228, on the other hand, allow excess pressure that could damage the cylinders (such as from thermal expansion when sunlight heats up the cylinder) to escape.

The pilot operated valves 221 and 223 are identical, and are preferably Model No. DKJS-XHN valve cartridges from Sun Hydraulics. These are what is known as pilot to open, two way valves with an internal static drain. The relief valve 226 and the check valves 222 are preferably both built into the same commercially available Model SCIA-CCN cartridge from Sun Hydraulics. Relief valve 228 and check valve 224 are likewise part of one cartridge. All four cartridges are screwed into a single manifold mounted to the middle of the cylinder. This manifold is connected to the ends of the cylinder 34 by welded piping that is an integral part of cylinder 34. Relief valves 228 are preferably set at 5000 psi, and relief valves 226 are preferably set at 3000 psi. Any leakage from valves 228, 226, 223 and 221 is directed to the low pressure reservoir, which is preferably a tank at atmospheric pressure.

The accessories pump 205 is preferably one of three sections of a gear pump Model 323 9639 161 from Commercial Intertech of Youngstown, Ohio. Another section of this gear pump is the super charge pump that supplies charge pump 203. In crane 10, the accessories pump 205 is used to power components on the lower works 16 through line 252, such as jacking cylinders 104, as well as to supply make-up fluid for the closed loop pump 201. Line 281 is a pressure pilot line from a power beyond port of a valve on the lower works. It is used to operate the piston of piston check valve 282 within the pump unload valve depicted by dotted line 280. The pump unload valve also includes an orifice 283 which bleeds to tank. A relief valve 285 is in parallel with the piston check valve 282. The relief valve 285 allows for pressure relief when pump 205 is running but fluid is not needed in line 252, but check valve 282 is not open. Normally, flow through line 251 is directed through valve 282 because the power beyond valve provides a signal through line 281 to open piston check valve 282. The orifice 283 allows pressure to bleed out of line 281 so that check valve 282 can close when fluid is desired to flow through line 252. A filter 270 cleans the fluid as it flows out of the pump unload valve 280 so that fluid entering the closed loop circuit through replenish-hot oil manifold 206 is filtered. A check valve with substantial resistance 271 provides a parallel flow path to the hot oil manifold 206 if filter 270 becomes blocked. Preferably a filter, not shown, is provided between the supercharger and the charge pump 203. The supercharger preferably provides hydraulic fluid at 75 psi.

If the charge pump 203 were large enough, it could be used to supply the make-up fluid needed for the cylinder differential through check valves 207 and lines 217 or 219. However, in the preferred, commercially available variable displacement pump with built in directional control 208, the built in charge pump 203 is not large enough to perform that function, and thus the accessories pump 205 is used.

The preferred hot oil shuttle valve 229 has pressure pilot lines connected to lines 213 and 233 to automatically operate the shuttle valve. When the pressure in line 233 is higher than the pressure in line 213, line 255 will be connected to line 213. On the other hand, when the pressure in line 213 is higher than the pressure in line 233, line 255 will be connected to line 233.

Check valves 241 and 242 are included in the replenish hot oil manifold 206 to take care of operating conditions in which the pressure differential between lines 213 and 233 is insufficient to open shuttle valve 229. This is likely to occur at steep boom angles when the cylinder 34 are only in slight compression or tension. During these situations, make up fluid from line 255 can still enter the low pressure side of the circuit through check valve 241 or 242, depending on whether line 258 or 256 has the lowest pressure. Check valves 241 and 242, which have a slight resistance, can also provide a parallel path for fluid to enter the closed loop part of the circuit. When the shuttle valve 229 is open, it will have a small pressure drop across it as fluid starts to flow through it. When this pressure drop equals the slight pressure needed to open the check valves 241 or 242, fluid will take both paths. Shuttle valve 229, however, provides the normal path by which fluid leaves the closed loop portion of the circuit since check valves 241 and 242 only allow flow in one direction.

Relief valve 227 is preferably set to open at 350 psi. This maintains a minimum of 350 psi in the hydraulic circuit, which is important because when accessories pump 205 is running and no fluid is needed for the accessories or as make-up fluid in the closed loop part of the cylinder circuit, the fluid from pump 205 will unload through pump unload valve 280 and through lines 253, 254, 255 and 257. Relief valve 227 therefore maintains a minimum pressure for pump 205. Pilot operated relief valve 209 similarly provides a minimum pressure and relief for charge pump 203.

The hydraulic system is preferably controlled by a microprocessor as part of the overall crane control function.

Examples of control systems for lift cranes using a microprocessor to control hydraulic functions are disclosed in U.S. Pat. Nos. 5,189,605; 5,297,019 and 5,579,931, all of which are hereby incorporated by reference. As such, the crane 10 will preferably include transducers, such as transducers 290, 292, 294 and 296, to monitor the fluid pressure at different points in the hydraulic system. Transducers 292 and 294 are used when the cylinders are in tension. If simple logic is used to control the hydraulic circuit when the cylinders are in compression, transducers 290 and 296 may not be needed.

Instead of using two separate valves 272 and 274 in cylinder directional control valve assembly 225, a single four port, two solenoid, three position valve such as Model No. 4WEJ6X/EG12N9Z45 valve from Mannesmann Rexroth could be used. In that case the valve would either be in a closed position, preventing any movement of the cylinder, or in a boom up or boom down position. In still a further alternative, a two position, three way valve with only one solenoid could be used. In that case, the cylinders 34 would operate when the valve was actuated, and the movement direction of the cylinders would be controlled only by the pump swash plate.

One of the benefits of using the two separate valves 272 and 274 in directional control valve assembly 225 is that both valves can be opened simultaneously. One problem which was encountered when a single valve was used in an earlier design of the hydraulic circuit used on crane 10 was that as loads were applied to the cylinders 34 with the valves 221 and 223 closed (such as when the crane picks up a load, and the tension in the rods is increased), the side of piston 237 which is under increased pressure compresses slightly, allowing the piston 237 to move and extra fluid to enter the opposite side of the cylinder through check valve 222 or 224. When the load is removed, this fluid stays in the cylinder, and the side of the cylinder with the extra fluid in it ends up with a higher fluid pressure than the circuit pressure. When the valve to that side of the cylinder is later opened, the extra fluid spurts out and the cylinder jerks.

By allowing both valves 272 and 274 to be operated independently, both valves 221 and 223 can be open, closed or one can be open while the other is closed. This gives more flexibility to the control of the cylinders 34. Also, the jerking problem can be avoided by leaving the appropriate valve open. For example, when the boom is in its proper position to lift a load, and the rods 38 are in tension, valve 272 can be actuated, which will then open valves 221. Since the cylinders are in tension and valves 223 are closed, the pistons 237 will not move. However, as a load is picked up by the crane, the pressure increases in rod end 240 of cylinders 34. As the fluid on that side compresses slightly, the piston moves and fluid enters piston end 238. When the load is released, the tension in rods 38 is returned to where it was before the load was picked up, and the extra fluid that entered piston end 238 of cylinders 34 can flow back out through open valve 221, avoiding the build up of extra pressure. Thus, all the time the crane is lifting loads the valves 221 can be left open, and if the boom angle needs to be changed, valves 223 are opened as described before. When the cylinders 34 are in compression, valves 223 can be left open to avoid the same problem of extra fluid in the rod end 240 when the amount of compressive load is increased and then reduced.

In the preferred embodiment of the crane 10, the rod 38 is sized so that it carries intended loads in compression. Since it is desirable to keep the diameter of the rod 38 to a minimum, and because the buckling strength of a rod decreases as its effective length increases, the counterweight handling system is designed so that the rods 38 only have to be operated with limited extension while the cylinders 34 are in compression. This reduces the potential buckling problem and allows the rods 38 to be designed with smaller diameters than if the rods 38 could be fully extended in compression. The tensile strength of the material used to make the rods 38 is high enough so that even at this smaller diameter, the rods 38 have sufficient tensile strength to safely handle maximum expected tension loads.

The preferred hydraulic circuit described above allows a closed loop pump to power the double-acting hydraulic cylinders 34. It also provides that the extra fluid needed to make up for the cylinder differential is always added to the low pressure side of the circuit. Since the closed loop pump often handles overhauling loads, sometimes the low pressure side of the circuit is connected to the discharge port of the closed loop pump. The preferred circuit takes this into account, and allows the make-up fluid to go to the pump when the intake port is on the low pressure side, or go to the cylinder when the pump intake port is on the high pressure side. In this way the circuit can be used to operate the double-acting cylinders in both a tension and compression situation. Further, the pump supplying the make-up fluid can be less expensive because it is always supplying to the low pressure side of the circuit.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A hydraulic circuit comprising:

a) a first double-acting hydraulic cylinder having a bore, a piston mounted in said bore and forming a piston end of said cylinder, and a rod connected to said piston opposite said piston end and extending out of an exit end of the bore but being sealed at the exit end of the bore, thus forming a rod end of said cylinder, the cylinder having a first passageway in communication with said piston end and a second passageway in communication with the said rod end;

b) a closed loop hydraulic pump having, during operation, a low pressure port in fluid communication with a low pressure side of the hydraulic circuit and a high pressure port in fluid communication with a high pressure side of the hydraulic circuit;

c) a directional flow controller and hydraulic lines connecting the closed loop pump and the double-acting cylinder such that fluid from the pump can be directed to either said first or second passageways and fluid from the other of said first or second passageways is directed to return to the pump;

d) a second hydraulic pump in fluid communication with the closed loop hydraulic pump so as to supply make-up hydraulic fluid to the low pressure side of the hydraulic circuit when said rod is being extended;

e) a valve in fluid communication with the first passageway when the rod is being retracted to allow excess hydraulic fluid to flow out of the circuit;

f) first and second pilot operated valves, the first pilot operated valve controlling flow of hydraulic fluid out of the first passageway and the second pilot operated valve controlling flow of hydraulic fluid out of the second passageway; and g) a cylinder directional control valve assembly connected to a charge pump which provides pressurized hydraulic fluid to operate the first and second pilot operated valves.

2. The hydraulic circuit of claim 1 wherein the directional flow controller is built into the closed loop pump such that the ports on the pump can be alternatively used as discharge and intake ports.

3. The hydraulic circuit of claim 1 wherein the pump is a variable displacement pump.

4. The hydraulic circuit of claim 1 further comprising a replenish manifold valve which connects said second pump to the low pressure side of the hydraulic circuit when the rod is being extended and connects the first passageway to the valve when the rod is being retracted.

5. The hydraulic circuit of claim 1 wherein the valve is a pilot operated relief valve.

6. The hydraulic circuit of claim 1 wherein the cylinder directional control valve assembly is electrically operated.

7. The hydraulic circuit of claim 1 wherein the charge pump and the closed loop pump are built together and powered from a common drive shaft.

8. The hydraulic circuit of claim 1 further comprising a second double-acting hydraulic cylinder having the same components and acting in parallel with said first double-acting cylinder.

9. The hydraulic circuit of claim 1 wherein the excess hydraulic fluid from the valve flows to a low pressure reservoir.

10. The hydraulic circuit of claim 1 wherein the charge pump is a different pump than the second hydraulic pump.

11. The hydraulic circuit of claim 1 wherein the control valve assembly comprises two valves each having at least first and second positions which can be operated independently of each other.

12. A lift crane having an upper works rotatably mounted on a lower works and a boom pivotally mounted on the upper works comprising:

a) a mast pivotally connected to the upper works, the upper works also comprising at least one load hoist line;

b) a hydraulic circuit including a double-acting hydraulic cylinder having a bore, a piston mounted in the bore and forming a piston end of said cylinder, and a rod connected to said piston opposite said piston end and extending out of an exit end of the bore but being sealed at the exit end of the bore, thus forming a rod end of said cylinder, the cylinder having a first passageway in communication with said piston end and a second passageway in communication with said rod end, one of the piston end of the cylinder and the rod being pivotally connected to the upper works and the other of the piston end of the cylinder and the rod being pivotally connected to the mast;

c) a closed loop hydraulic pump having, during operation, a low pressure port in fluid communication with a low pressure side of the hydraulic circuit and a high pressure port in fluid communication with a high pressure side of the hydraulic circuit;

d) a directional flow controller and hydraulic lines connecting the closed loop pump and the double-acting cylinder such that fluid from the pump can be directed to either said first or second passageways and fluid from the other of said first or second passageways is then directed to return to the pump;

e) a second hydraulic pump in fluid communication with the closed loop hydraulic pump so as to supply make-up hydraulic fluid to the low pressure side of the hydraulic circuit when said rod is being extended;

f) a valve in fluid communication with the first passageway when the rod is being retracted to allow excess hydraulic fluid to flow out of the circuit;

g) first and second pilot operated valves, the first pilot operated valve controlling flow of hydraulic fluid out of the first passageway and the second pilot operated valve controlling flow of hydraulic fluid out of the second passageway; and h) a cylinder directional control valve assembly connected to a charge pump which provides pressurized hydraulic fluid to operate the first and second pilot operated valves.

13. The crane of claim 12, wherein the directional flow controller is built into the closed loop pump such that the ports on the pump can be alternatively used as the discharge and intake ports.

14. The crane of claim 12 wherein the rod is pivotally connected to the mast and the piston end of the cylinder is pivotally connected to the upper works.

15. The crane of claim 12 wherein the ratio of the change in volume of the rod end to the change in volume of the piston end as the rod is extended or retracted is between about 1:2 and about 1:1.1.

16. The crane of claim 15 wherein said ratio is about 1:1.27.

17. The crane of claim 12 wherein when the double acting cylinder is in tension and being extended, the make-up fluid is directed to the piston end of the cylinder.

18. The crane of claim 12 wherein when the double acting cylinder is in compression and being extended, the make-up fluid is directed to an intake port of the closed loop pump.

19. The crane of claim 12 wherein the pump is a variable displacement pump.

* * * * *